United States Patent
Suzuki et al.

(10) Patent No.: US 8,279,318 B2
(45) Date of Patent: Oct. 2, 2012

(54) IMAGE PICKUP APPARATUS AND DISPLAY CONTROL METHOD FOR THE SAME

(75) Inventors: Jun Suzuki, Kawasaki (JP); Yoshinobu Sato, Yokohama (JP); Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 582 days.

(21) Appl. No.: 12/331,724

(22) Filed: Dec. 10, 2008

(65) Prior Publication Data

US 2009/0153720 A1 Jun. 18, 2009

(30) Foreign Application Priority Data

Dec. 14, 2007 (JP) ................ 2007-322770
Dec. 14, 2007 (JP) ................ 2007-322818
Oct. 20, 2008 (JP) ................ 2008-270058

(51) Int. Cl.
*H04N 5/222* (2006.01)
(52) U.S. Cl. ............................... 348/333.01
(58) Field of Classification Search ............. 348/346, 348/349, 350, 333.01, 345
See application file for complete search history.

(56) References Cited

U.S. PATENT DOCUMENTS

| | | | | |
|---|---|---|---|---|
| 6,829,008 | B1 * | 12/2004 | Kondo et al. | 348/302 |
| 7,474,352 | B2 * | 1/2009 | Oikawa | 348/349 |
| 2004/0179128 | A1 * | 9/2004 | Oikawa | 348/345 |
| 2009/0153693 | A1 * | 6/2009 | Onuki et al. | 348/222.1 |
| 2010/0045849 | A1 * | 2/2010 | Yamasaki | 348/349 |
| 2010/0110272 | A1 * | 5/2010 | Sugawara | 348/341 |
| 2010/0194967 | A1 * | 8/2010 | Amano | 348/345 |
| 2010/0238343 | A1 * | 9/2010 | Kawarada | 348/345 |

FOREIGN PATENT DOCUMENTS

| | | |
|---|---|---|
| JP | 2000-156823 | 6/2000 |
| JP | 2001-309210 | 11/2001 |
| JP | 2005-080093 | 3/2005 |

* cited by examiner

*Primary Examiner* — Chieh M Fan
*Assistant Examiner* — Fayez Bhuiyan
(74) *Attorney, Agent, or Firm* — Cowan, Liebowitz & Latman, P.C.

(57) ABSTRACT

An image pickup apparatus of the present invention comprises an image obtaining part configured to photoelectrically convert a first object image and a second object image formed by light fluxes divided by a pupil divider among light fluxes from an image pickup optical system to generate a first image and a second image, a displaying part configured to display images, and a processing part configured to cause the displaying part to display a superimposed image formed by superimposing the first and second images on each other.

5 Claims, 21 Drawing Sheets

REAL IMAGE

A IMAGE DATA

B IMAGE DATA

DOUBLE IMAGE

DIFFERENTIAL IMAGE (BINARY IMAGE)

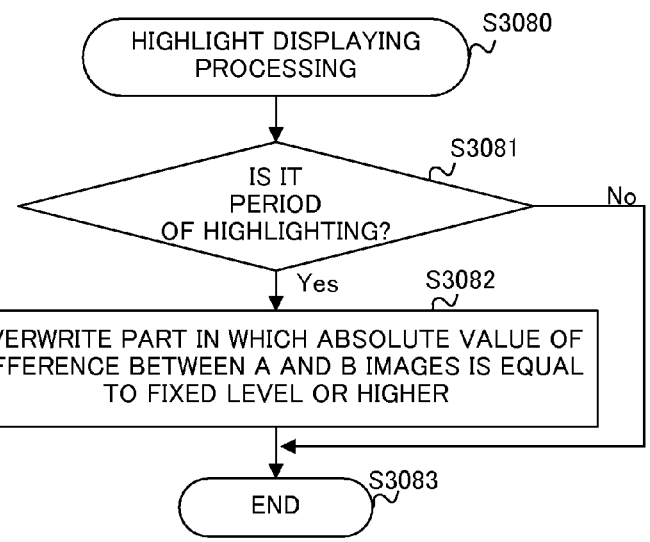
FIG. 32
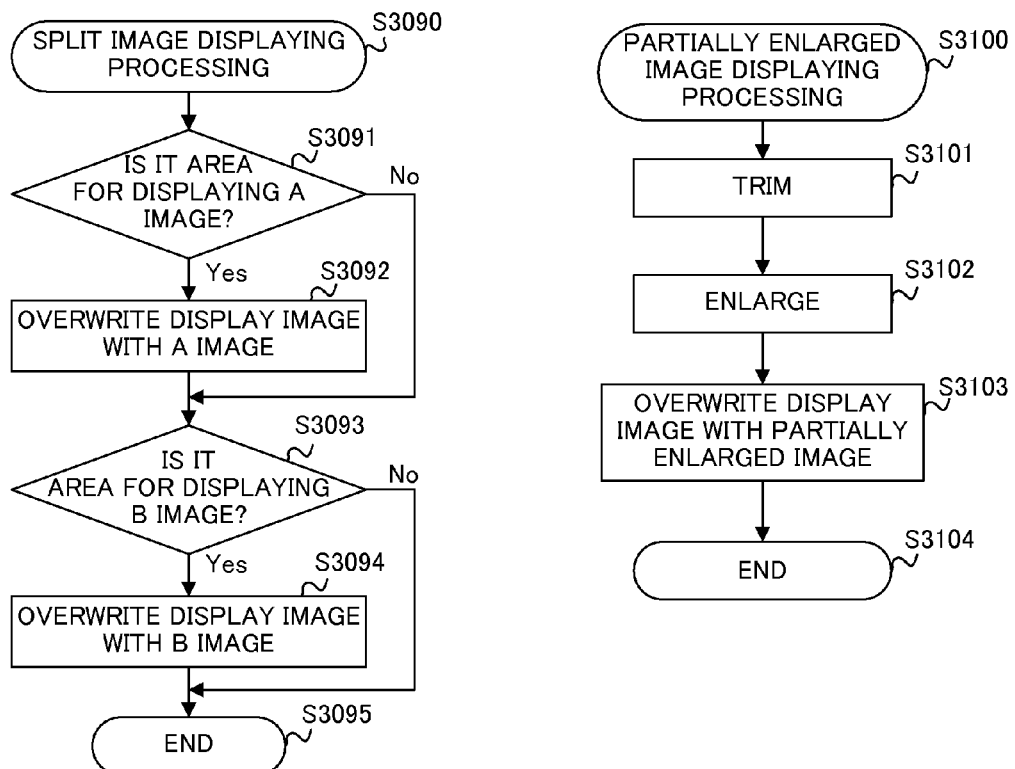
FIG. 33
FIG. 34

IMAGE PICKUP APPARATUS AND DISPLAY CONTROL METHOD FOR THE SAME

BACKGROUND OF THE INVENTION

The present invention relates to an image pickup apparatus such as a digital camera or a video camera, and more particularly to an image pickup apparatus which has a function of displaying a guide image for manual focusing.

Japanese Patent Laid-Open No. 2000-156823 discloses a focus detection method in autofocusing of the image pickup apparatus. According to this focus detection method, a pixel group for focus detection is discretely disposed in an image generation pixel group of an image pickup element, and a light flux from an image pickup optical system is divided (pupil division) by a microlens disposed in the front of the focus detection pixel group to form a pair of object images on the focus detection pixel group. A defocus amount of the image pickup optical system is obtained by detecting a phase difference between the pair of object images.

Each of Japanese Patent Laid-Open Nos. 2001-309210 and 2005-080093 discloses an image pickup apparatus which displays a guide image (focus guide image) for supporting a manual focusing operation when a user performs manual focusing.

In the image pickup apparatus disclosed in Japanese Patent Laid-Open No. 2001-309210, a focus guide image equivalent to a split image frequently employed for an optical viewfinder of a film camera is electronically generated to be displayed on an electronic viewfinder. In the image pickup apparatus disclosed in Japanese Patent Laid-Open No. 2005-080093, in an out-of-focus state, a double image corresponding to a defocus amount of an image pickup optical system is generated from a single image obtained by using an image pickup element to be displayed as a focus guide image on an electronic viewfinder.

However, in the image pickup apparatus disclosed in Japanese Patent Laid-Open No. 2001-309210, as a focus guide image, the image equivalent to the split image indicating a situation of left-and-right shifting of upper and lower parts of an object is displayed in a part of a normal display image. In this case, unless accustomed to using the split image to a certain extent, a user may find it difficult to perform manual focusing quickly and accurately.

In the image pickup apparatus disclosed in Japanese Patent Laid-Open No. 2005-080093, if the image pickup apparatus is not focused in an object targeted for focusing, another object on which the image pickup apparatus is focused may be superimposed to be displayed. Consequently, a user may find it difficult to quickly determine in which of a close direction and an infinity direction he should perform a manual focusing operation for the object targeted for focusing.

BRIEF SUMMARY OF THE INVENTION

The present invention provides an image pickup apparatus capable of displaying a focus guide image which is easily understood visually, and its image displaying method.

An image pickup apparatus as one aspect of the present invention comprises an image obtaining part configured to photoelectrically convert a first object image and a second object image formed by light fluxes divided by a pupil divider among light fluxes from an image pickup optical system to generate a first image and a second image, a displaying part configured to display images, and a processing part configured to cause the displaying part to display a superimposed image formed by superimposing the first and second images on each other.

An image pickup apparatus as another aspect of the present invention comprises an image obtaining part configured to photoelectrically convert a first object image and a second object image formed by light fluxes divided by a pupil divider among light fluxes from an image pickup optical system to generate a first image and a second image, and photoelectrically converting a third object image formed by a light flux undivided by the pupil divider to generate a third image, a displaying part configured to displaying images, and a processing part configured to display one of areas of the third image displayed by the displaying part in which displacement amounts between the first and second object images are larger and smaller than a predetermined value by using a specific color.

An image pickup apparatus as another aspect of the present invention comprises an image obtaining part configured to photoelectrically convert a first object image and a second object image formed by light fluxes divided by a pupil divider among light fluxes from an image pickup optical system to generate a first image and a second image, and photoelectrically converting a third object image formed by a light flux undivided by the pupil divider to generate a third image, a displaying part configured to display images, a first image generating part configured to generate a first focus guide image by using the first and second images, a second image generating part configured to generate a second focus guide image different from the first focus guide image by using one of the first and second images and the third image, and a controller configured to switch the first and second focus guide images to display the switched focus guide image by the displaying part.

An image displaying method as another aspect of the present invention is an image displaying method for an image pickup apparatus including a displaying part comprising the steps of photoelectrically converting a first object image and a second object image formed by light fluxes divided by a pupil divider among light fluxes from an image pickup optical system to generate a first image and a second image, and photoelectrically converting a third object image formed by a light flux undivided by the pupil divider to generate a third image, and superimposing an image indicating a difference between two of the first, second and third images on the third image to display the superimposed image by the displaying part.

An image displaying method as another aspect of the present invention is an image displaying method for an image pickup apparatus including a displaying part comprising the steps of photoelectrically converting a first object image and a second object image formed by light fluxes divided by a pupil divider among light fluxes from an image pickup optical system to generate a first image and a second image, and photoelectrically converting a third object image formed by a light flux undivided by the pupil divider to generate a third image, and displaying one of areas of the third image displayed by the displaying part in which displacement amounts between the first and second object images are larger and smaller than a predetermined value by using a specific color.

An image displaying method as another aspect of the present invention is an image displaying method for an image pickup apparatus including a displaying part comprising the steps of photoelectrically converting a first object image and a second object image formed by light fluxes divided by a pupil divider among light fluxes from an image pickup optical system to generate a first image and a second image, and photoelectrically converting a third object image formed by a light flux undivided by the pupil divider to generate a third image, generating a first focus guide image by using the first and second images, generating a second focus guide image different from the first focus guide image by using one of the first and second images and the third image, and switching the first and second focus guide images to display the switched focus guide image by the displaying part.

Other aspects of the present invention will be apparent from the embodiments described below with reference to the drawings.

BRIEF DESCRIPTION OF THE DRAWINGS

FIG. 32 is a flowchart showing highlight image display processing in Embodiment 10.

FIG. 33 is a flowchart showing split image display processing in Embodiment 10.

FIG. 34 is a flowchart showing partially enlarged image display processing in Embodiment 10.

DETAILED DESCRIPTION OF THE EMBODIMENTS

Exemplary embodiments of the present invention will be described below with reference to the accompanied drawings.

Embodiment 1

Figure 1:
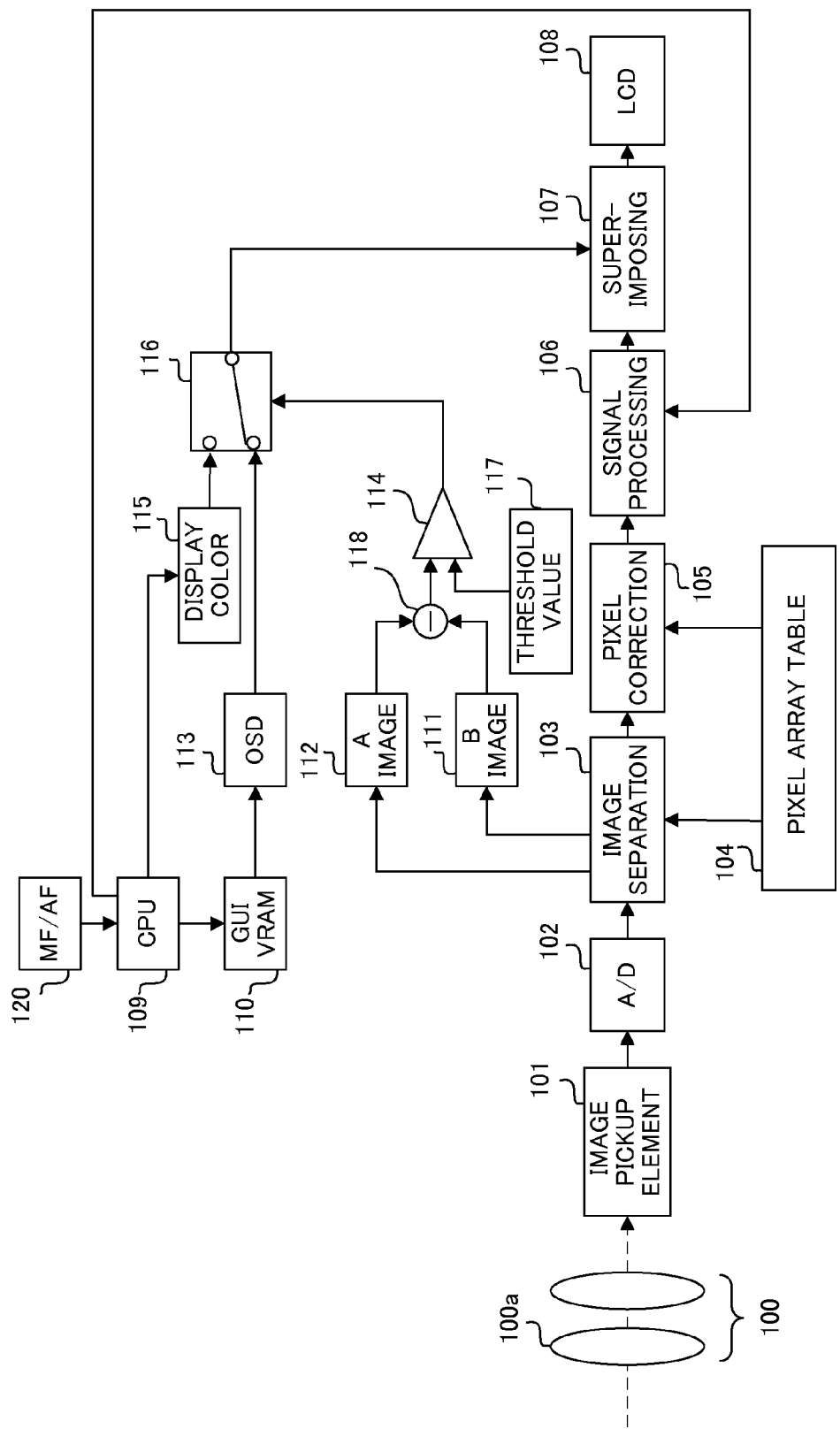
FIG. 1 is a block diagram showing a configuration of a camera that is Embodiment 1 of the present invention.

FIG. 1 shows a configuration of a digital camera (image pickup apparatus) which is Embodiment 1 of the present invention. Digital cameras include a digital still camera and a video camera. In this case, the digital still camera will be described.

In FIG. 1, reference numeral 100 denotes an image pickup optical system, which includes a focus lens 100*a*. The image pickup optical system 100 may be detachably attached to a camera main body (not shown) as an interchangeable lens or integrated with the camera main body.

Reference numeral 101 denotes an image pickup element that includes a CCD sensor or a CMOS sensor, and photo-electrically converts an object image formed by a light flux from the image pickup optical system 100.

Figure 2:
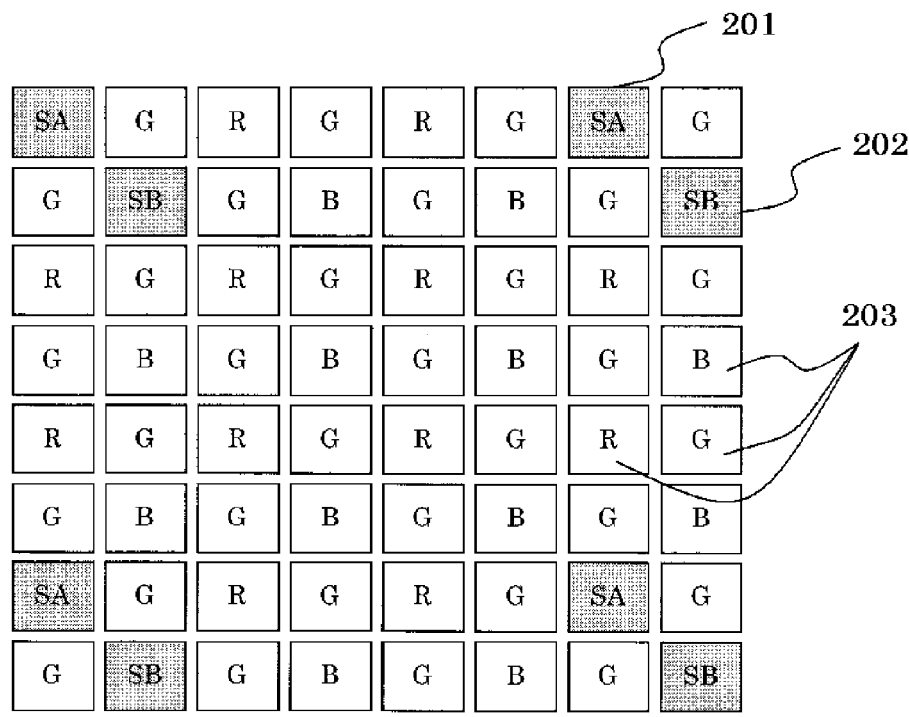
FIG. 2 is a view showing a pixel array of an image pickup element which is used for a camera of Embodiment 1.

Referring to FIG. 2, a pixel array in the image pickup element 101 will be described. FIG. 2 shows a partial pixel array in an image pickup plane of the image pickup element 101.

On the image pickup plane (single image pickup element), a normal image generation pixel group (third pixel group: hereinafter referred to as image pickup pixel) 203 that includes color filters of R, G, and B is disposed. The image pickup pixel group 203 includes an A image pixel group (SA: first pixel group) 201 and a B image pixel group (SB: second image group) 202 that are discretely arranged.

Figure 5A:
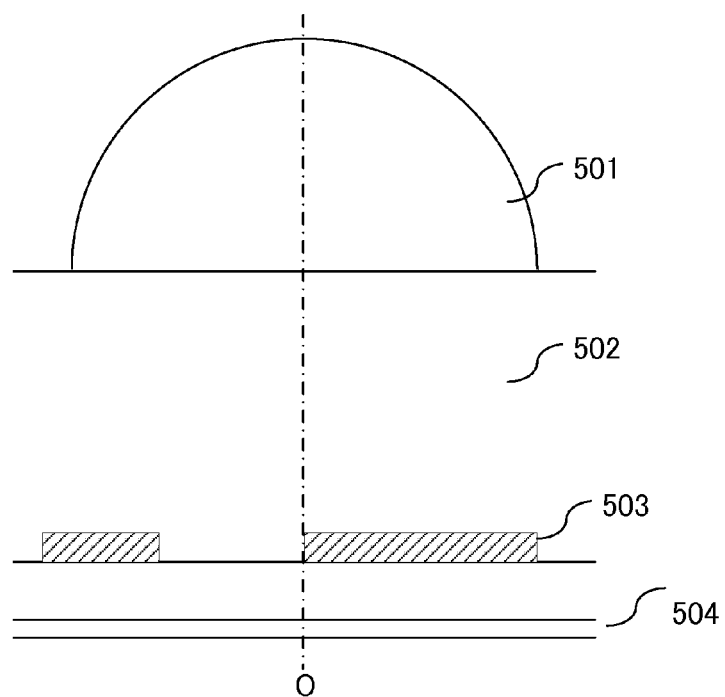
FIG. 5A is a sectional view showing a structure of an A image pixel in the image pickup element of FIG. 2.

FIG. 5A shows a structure of one pixel of the A image pixel group 201. As shown, a microlens 501 is formed on a light entrance side of the A image pixel. Reference numeral 502 denotes a smooth layer that constitutes a plane to form the microlens 501.

Reference numeral 503 denotes a shield layer that includes an aperture opening eccentric in one direction with respect to a center O of a photoelectric conversion area 504 of the A image pixel.

Figure 5B:
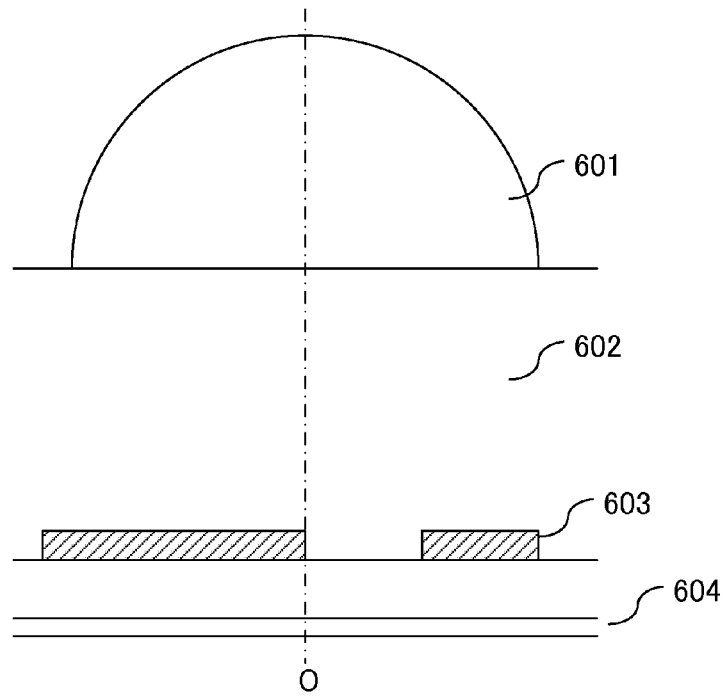
FIG. 5B is a sectional view showing a structure of a B image pixel in the image pickup element of FIG. 2.

FIG. 5B shows a structure of one pixel of the B image pixel group 202. A microlens 601 is formed on a light entrance side of the B image pixel. Reference numeral 602 denotes a smooth layer that constitutes a plane to form the microlens 601.

Reference numeral 603 denotes a shading layer that includes an aperture opening eccentric in a direction opposed to the shading layer 503 disposed in the A image pixel with respect to a center O of a photoelectric conversion area 604 of the B image pixel. In other words, the shading layers 503 and 603 of the A and B image pixels include the aperture openings disposed in symmetrical positions at optical axes of the microlenses. A pupil divider is configured by disposing the shading layers 503 and 603.

This configuration makes viewing of the image pickup optical system from the A image pixel and the B image pixel equivalent to symmetrical division of a pupil of the image pickup optical system. In other words, a light flux from the image pickup optical system is pupil-divided into two light fluxes, and the divided light fluxes (first and second light fluxes) respectively enter the A and B image pixels.

In FIG. 2, on the A and B image pixels 201 and 202, two more proximate images (A and B images) are formed as the number of pixels of the image pickup element 101 is larger. In an in-focus state of the image pickup element on an object, outputs (image signals) respectively obtained from the A and B image pixel groups 201 and 202 match each other.

On the other hand, if the image pickup optical system is in an out-of-focus state, a phase difference is generated between the image signals obtained from the A and B image pixel groups 201 and 202. A direction of the phase difference is reversed between a front focus state and a rear focus state.

Figure 5C:
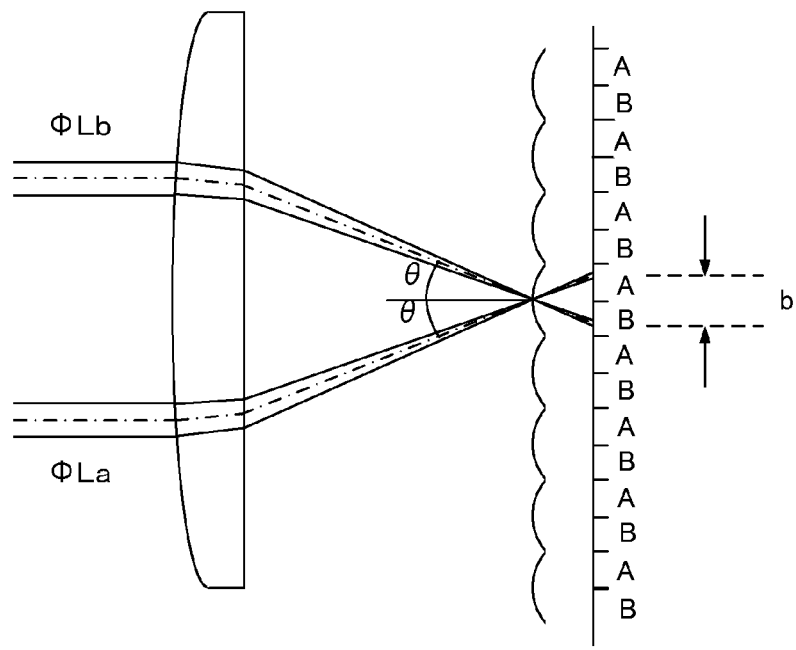
FIG. 5C is a schematic diagram showing a phase difference between image signals in a focused state of the image pickup element of FIG. 2.
Figure 5D:
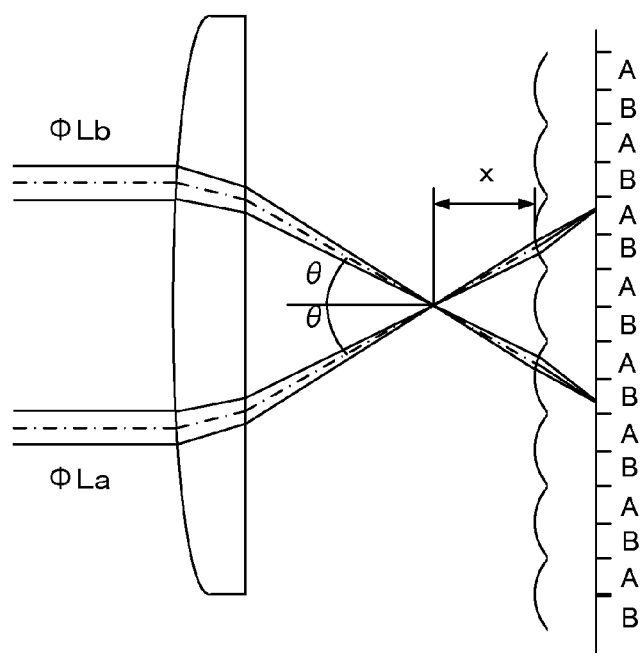
FIG. 5D is a schematic diagram showing a phase difference between image signals in an unfocussed state of the image pickup element of FIG. 2.

Each of FIGS. 5C and 5D shows a relationship between a focused state and a phase difference. In these drawings, the A and B image pixel groups 201 and 202 are brought close to each other, and respectively indicated by A and B points. The image pickup pixel 203 is not shown.

A light flux from a specific point of the object is divided into a light flux $\Phi La$ that passes through a divided pupil corresponding to the A image pixel A to enter the A image pixel A, and a light flux $\Phi Lb$ that passes through a divided pupil corresponding to the B image pixel B to enter the B image pixel B. These two light fluxes have entered from the same point of the object, and accordingly pass through the same microlens to reach one point on the image pickup element in an in-focus state of the image pickup optical system as shown in FIG. 5C. Thus, image signals obtained from the A and B image pixels A (201) and B (202) match each other.

However, as shown in FIG. 5D, in a state of being unfocused by x, reaching positions of the light fluxes $\Phi La$ and $\Phi Lb$ shift from each other by an amount equal to a change in incident angles of the light fluxes $\Phi La$ and $\Phi Lb$ to the microlens. In consequence, a phase difference is generated between image signals obtained from the A and B image pixel groups A (201) and B (202).

Utilizing the aforementioned configuration enables the camera of the embodiment to perform focus detection by using the image pickup element 101.

In the embodiment, by making use of photoelectric conversion of the two object images (A and B images) having a phase difference due to the A and B image pixel groups 201 and 202, a first image (A image data) corresponding to the A image (first object image) is generated based on a signal from the A image pixel group 201. A second image (B image data) corresponding to the B image (second object image) is generated based on a signal from the B image pixel group 202. On the image pickup pixel group 203, an object image (third object image) is formed by a light flux not divided by the shading layer 503 or 603. A normal image pickup image (or display image: third image) is generated by using a signal from the image pickup pixel group 203.

In FIG. 1, reference numeral 102 denotes an A/D converter for converting an analog signal output from the image pickup element 101 into a digital signal (pixel signal).

Reference numeral 103 denotes an image separating circuit. A pattern of the pixel array shown in FIG. 2 is stored as a pixel array table in a pixel array table memory 104.

The image separating circuit 103 separates pixel signals of the A and B image pixel groups 201 and 202 and the image pickup pixel group 203 from a pixel signal output from the A/D converter 102 according to the pixel array table. The image separating circuit 103 outputs the pixel signal of the A image pixel group 201 to an A image holding circuit 112 and a pixel correcting circuit 105, and the pixel signal of the B image pixel group 202 to a B image holding circuit 111 and the pixel correcting circuit 105. The image separating circuit 103 outputs the pixel signal of the image pickup pixel group 203 to the pixel correcting circuit 105.

The pixel correcting circuit 105 interpolates, by referring to the pixel array table, pixel values of the A and B image pixels based on the pixel signals of the image pickup pixels arranged around the A and B image pixels. Originally, R or B color filters are disposed in the A and B image pixels by the same pattern as that of the image pickup pixel group 203. Thus, the pixel correcting circuit 105 interpolates pixel values of the A and B image pixels by using pixel values of the image pickup pixels present around the A and B image pixels having color filters of the same colors as those of the color filters of the A and B image pixels.

As a result, a pixel signal after pixel interpolation of the pixel signal from the image pickup pixel group 203 is output from the pixel correcting circuit 105.

Reference numeral 106 denotes a signal processing circuit. The signal processing circuit 106 processes the pixel signal from the pixel correcting circuit 105 in various ways, and generates an image signal (hereinafter referred to as a video signal) indicating a normal image pickup image (recording image: third image) based on the pixel signal from the image pickup pixel group 203. The components from the image pickup element 101 to the signal processing circuit 106 constitute an image obtaining system (image obtaining part).

Next, the image processing system (a processing part) will be described. The A image holding circuit 112 shown in FIG. 1 holds the pixel signal (A image pixel signal) of the A image pixel group 201 input from the image separating circuit 103 until time immediately before next input of an A image pixel signal, and outputs the held A image pixel signal to a subtractor 118. The B image holding circuit 111 holds the pixel image (B image pixel signal) of the B image pixel group 202 input from the image separating circuit 103 until time immediately before next input of a B image pixel signal, and outputs the held B image pixel signal to the subtractor 118. Thus, the A and B image pixel signals respectively output from the A and B image holding circuits 112 and 111 constitute one-field images (or one-frame images) in video signals of the A and B images.

Figures 3, 4:
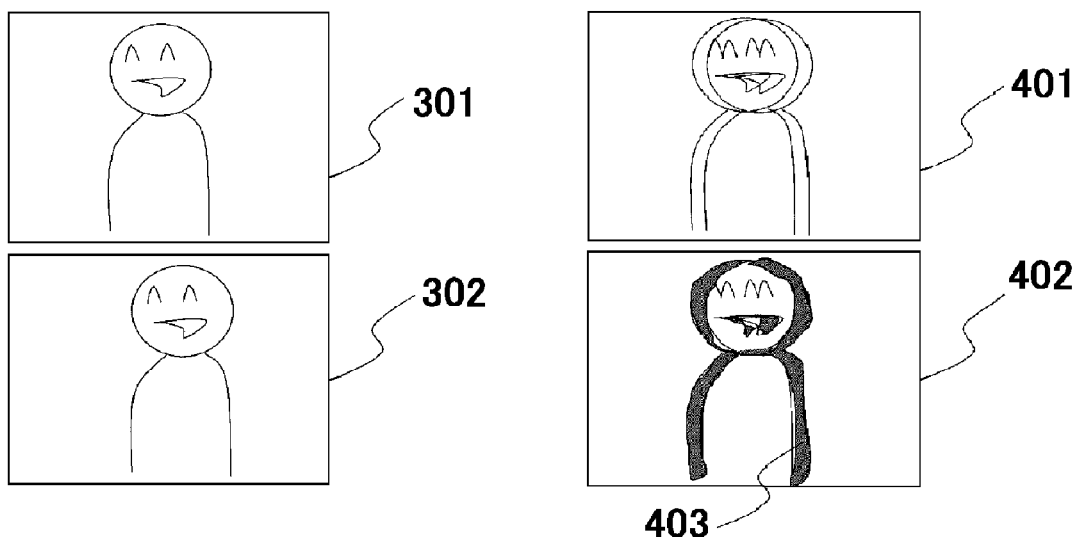
FIG. 3 is a view showing A and B images of Embodiment 1.
FIG. 4 is a view showing an example of an image in which the A and B images are superimposed and an example of highlighting in Embodiment 1.

In FIG. 3, reference numeral 301 denotes an example of an A image video signal, in other words, A image data (first image). Reference numeral 302 denotes an example of a B video signal, in other words, B image data (second image).

The image pickup optical system 100 is in an unfocussed state, and the A and B images formed on the image pickup element 101 are shifted from each other in a left-and-right direction. Thus, A and B images in the A and B image data have an amount of left-and-right shifting corresponding to the displacement amount on the image pickup element 101.

The subtractor 118 generates a difference signal equivalent to an absolute value of a difference between the A image pixel signal from the A image holding circuit 112 and the B image pixel signal from the B image holding circuit 111 to output it to a comparator 114. The difference signal corresponds to the displacement amount between the A and B images (between first and second object images). This displacement amount corresponds to a phase difference in a phase difference detection system.

The comparator 114 compares a threshold value as a predetermined value stored in a threshold value memory 117 with a value of the difference signal from the subtractor 118. The comparator 114 outputs "1" when a value of the difference signal is larger than the threshold value (or equal to the threshold value or larger), and "0" if not. A switch 116 described below is changed based on which of "1" and "0" an output from the comparator 114 is, in other words, which of a smaller value and a larger value the difference signal takes.

Reference numeral 110 denotes a GUI VRAM for holding a graphic image, and reference numeral 109 denotes a CPU. The CPU 109 controls an operation of each part of the image processing system.

The CPU 109 uses the pixel signal from the A image pixel group 201 and the pixel signal from the B image pixel group 202 as image signals to detect a phase difference therebetween, and obtains a defocus amount of the image pickup optical system 100 from the phase difference. The CPU 109 calculates a driving amount of the focus lens 100a based on the defocus amount, and controls the focus lens 100a to move only by the driving amount. In other words, the CPU 109 also functions as a focus controller for controlling a focus of the phase difference detection system.

Reference numeral 113 denotes an on-screen display (OSD) circuit for reading a graphic image from the VRAM 110 to generate an OSD video signal. The OSD video signal is for displaying graphical interface (GUI) information that the user needs to operate the camera. The GUI information contains information of a menu icon or a message, or the like.

Reference numeral 115 denotes a highlight display color output part for outputting a highlight display color signal in accordance with a color designated as a display color (specific color) by the CPU 109 of a highlight part described below.

The switch 116 changes one of the OSD video signal from the OSD circuit 113 and the highlight display color signal from the highlight display color output part 115 to a signal to be output to a superimpose synthesizing circuit 107 according to an output from the comparator 114. The switch 116 changes to the highlight display color output part 115 side if the signal from the comparator 114 is "1", and to the OSD circuit 113 side if the signal from the comparator 114 is "0".

The superimpose synthesizing circuit 107 superimposes an output (OSD video signal or highlight display color signal) from the switch 116 on the video signal output from the signal processing circuit 106. The configuration and the operation of the image processing system are as described above.

Reference numeral 108 denotes a display device (displaying part) that includes a LCD or the like. The display device 108 displays a video signal output from the superimpose synthesizing circuit 107.

Reference numeral 120 denotes a focus mode switch that enables the user to select one of a manual focus (MF) mode and an automatic focus (AF) mode. The CPU 109 outputs only a normal video signal from the superimpose synthesizing circuit 107 to the display device 108 if the AF mode is selected. A normal image pickup image (third image) is accordingly displayed by the display device 108.

On the other hand, if the MF mode is selected, the CPU 109 causes the superimpose synthesizing circuit 107 to superimpose and synthesize the video images of the A and B images. Then, the superimpose synthesizing circuit 107 outputs an AB superimposed video signal generated by the superimposing and the synthesizing to the display device 108. A superimposed image in which the A and B image data have been superimposed on each other (synthesized), in other words, a double image, is accordingly displayed by the display device 108.

This superimposed image (double image) becomes a focus guide image (may be referred to as focus support image or focus assist image) that serves as a guide for user's manual focusing operation. When the MF mode is selected, the focus guide image may be displayed on condition that a focus guide switch (not shown) is operated.

An upper side of FIG. 4 shows an example of a superimposed image (double image) displayed on the display device 108 by superimposing the A and B images shown in FIG. 3 on each other. The A and B images are displayed in a manner of being shifted from each other according to a defocus amount of the image pickup optical system 100. Even only by this superimposed image, information that becomes a guide for a manual focusing operation can be provided to the user in the form of being easily understood visually.

Though not shown in FIG. 4, on the superimposed image, the A and B images are displayed in the state of matching each other in an object area on which the image pickup optical system 100 is focused. Thus, when wishing to focus on the object area of an out-of-focus state, the user can intuitively determine in which of directions he should perform a manual focusing operation based on a distance of this object area near or far from the object area of the focused state.

In the embodiment, on the superimposed image, highlight displaying is performed according to a displacement amount between the A and B images. Specifically, if a difference signal from the subtractor 118 is larger (or equal to the threshold value or larger) than the threshold value (predetermined value) stored in the threshold value memory 117, the switch 116 changes to the highlight display color output part 115 side based on an output from the comparator 114. Thus, a highlight display signal from the highlight display color output part 115 is input to the superimpose synthesizing circuit 107. The superimpose synthesizing circuit 107 synthesizes the AB superimposed video signal with the highlight display color signal so as to highlight an area (highlight part) 403 hatched in the lower side of FIG. 4 by a highlight display color (specific color).

The highlight part 403 is an object area in which a displacement amount between the A and B images is larger than that corresponding to the threshold value, for example, a displacement area surrounded with outlines of the A and B images.

Thus, according to the embodiment, the object area in which the displacement amount between the A and B images on the superimposed image is larger than the threshold value is highlighted by the highlight display color (specific color). As a result, the user can instantly determine that the defocus amount of the image pickup optical system 100 with respect to the object area is large, or that he should perform a manual focusing operation greatly so as to focus on the object area. If the A and B images are merely displayed in a manner of being shifted from each other without being highlighted by the highlight display color, the user can instantly determine that he should perform a manual focusing operation finely.

Periodical outputting of highlight display color signals from the highlight display color output part 115 enables alternate switching between an ON-state in which highlighting is executed and an OFF-state in which no highlighting is executed, in other words, flashing of highlighting. The flashing of highlighting enables checking of an original object image of the highlight part when highlighting is unlit.

The superimposed image generation processing may be performed by using a computer program (software) as described below.

Embodiment 2

Embodiment 1 has been described by way of case in which the light flux from the image pickup optical system 100 is pupil-divided in the left-and-right direction to form the A and B images. However, the light flux may be pupil-divided in an up-and-down direction to form A and B images.

The light flux from the image pickup optical system 100 may be pupil-divided in left-and-right and up-and-down directions to form A and B images that make a pair in the left-and-right direction and A and B images that make a pair in the up-and-down direction.

Figure 6:
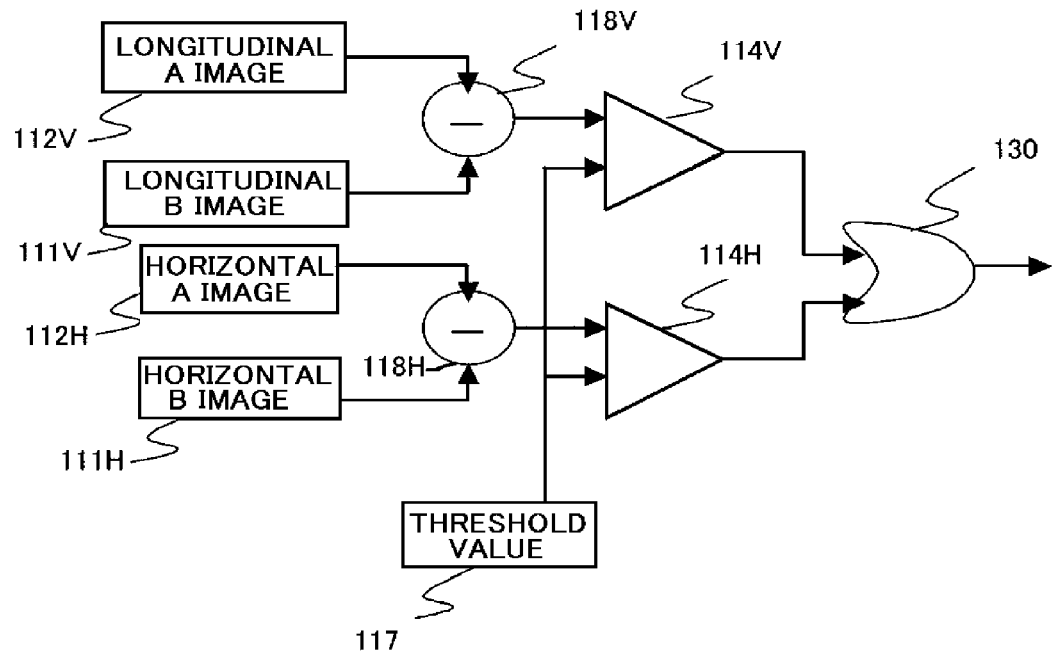
FIG. 6 is a block diagram showing a partial configuration of an image processing part of a camera that is Embodiment 2 of the present invention.

FIG. 6 shows a circuit structure that compares a displacement amount (difference signal) between each pair of A and B images when the light flux is pupil-divided in the left-and-right and up-and-down directions with the threshold value stored in the threshold value memory 117 shown in FIG. 1 to generate a signal for changing the switch 116. In Embodiment 2, components similar to those of Embodiment 1 are denoted by similar reference numerals.

Reference numerals 112H and 111H respectively denote horizontal A and B image holding circuits for holding and then outputting pixel signals of A and B images making a pair in a left-and-right direction (hereinafter referred to as horizontal A and B image pixel signals). Reference numerals 112V and 111V respectively denote longitudinal A and B image holding circuits for holding and then outputting pixel signals of A and B images making a pair in an up-and-down direction (hereinafter referred to as longitudinal A and B image pixel signals).

Reference numeral 118H denotes a horizontal subtractor that outputs a horizontal difference signal indicating a difference between the horizontal A and B image pixel signals. Reference numeral 118V denotes a longitudinal subtractor that outputs a longitudinal difference signal indicating a difference between the longitudinal A and B image pixel signals.

Reference numeral 114H denotes a horizontal comparator that outputs "1" if the horizontal difference signal is larger (or equal to or larger) than a threshold value stored in the threshold value memory 117, and "0" if not. Reference numeral 114V denotes a longitudinal comparator that outputs "1" if the longitudinal difference signal is larger (or equal to or larger) than a threshold value stored in the threshold value memory 117, and "0" if not.

Reference numeral 130 denotes an OR circuit that outputs "1" if at least one of outputs from the horizontal and longitudinal comparators 114H and 114V is "1", and "0" if both of them are "0".

A switch 116 changes to a highlight display color output part 115 side if the output from the OR circuit 130 is "1". The switch 116 changes to an OSD circuit 113 side if the output from the OR circuit 130 is "0".

In the embodiment, an object area in which a displacement amount between A and B images is large in at least one of the left-and-right and up-and-down directions is highlighted as a highlight part. Thus, the embodiment enables excellent manual focus guiding for both cases in which an outline of an object is constituted of a longitudinal line and in which an outline of an object is constituted of a horizontal line.

Embodiment 3

Embodiment 1 has been described by way of case in which the object area having a difference in displacement amount between the A and B images larger than the threshold value is highlighted as the highlight part. However, inserting an inverter between the output of the comparator 114 and the switch 116 of FIG. 1 enables highlighting of the object area having a difference in displacement amount between the A and B images smaller than the threshold value as a highlight part. As a result, Embodiment 3 enables manual focus guiding that allows a user to clearly recognize an object area of a near-focused state.

Embodiment 4

Embodiment 1 has been described by way of case in which the difference signal indicating the displacement amount between the A and B images is generated by the hardware, and the value of the difference signal is compared with the threshold value to switch between execution and nonexecution of highlighting. However, similar processing can be performed by software.

Embodiment 1 has been described by way of case in which the superimposed image (AB superimposed video signal) obtained by superimposing the A image data (video signal of the A image) and the B image data (video signal of the B image) on each other is displayed, and then the area having the large displacement amount between the A and B images is highlighted. However, Embodiment 4 will be described by way of case in which highlighting is performed on a normal image pickup image (third image) according to a displacement amount between A and B images.

Figure 7:
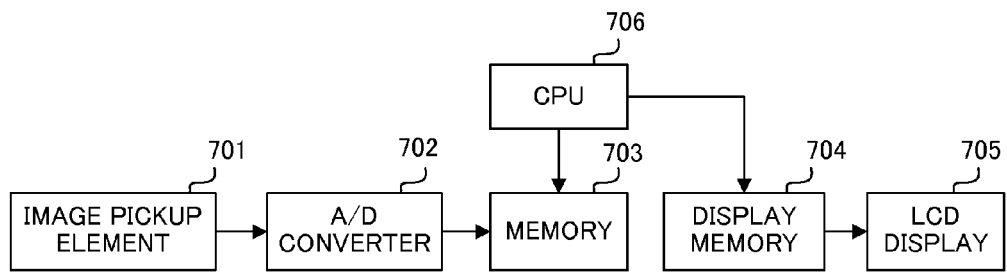
FIG. 7 is a block diagram showing a configuration of a camera that is Embodiment 4 of the present invention.

FIG. 7 shows a circuit structure when software processing is performed.

Reference numeral 701 denotes an image pickup element that has a configuration similar to that of the image pickup element 101 of Embodiment 1. Reference numeral 702 denotes an A/D converter for converting an analog signal output from the image pickup element 701 into a digital signal.

Reference numeral 703 denotes a memory for storing an A/D converted output of the image pickup element 701. Reference numeral 706 denotes a CPU that is a processing part for processing images stored in the memory 703 to generate normal video signals or A and B video signals (first and second images). Reference numeral 704 denotes a display memory for storing video signals.

Reference numeral 705 denotes a display device (displaying part) constituted of a LCD or the like.

Figure 8:
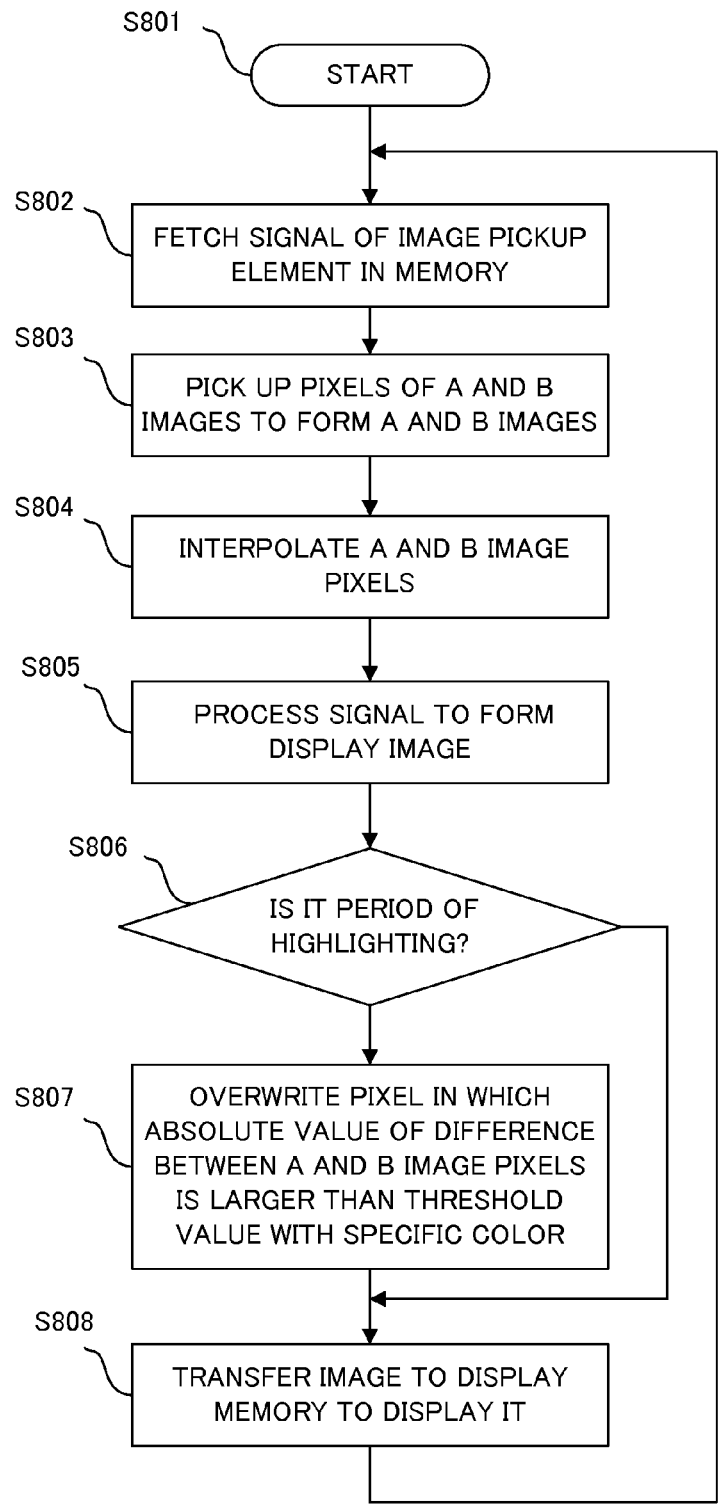
FIG. 8 is a flowchart showing a processing operation of Embodiment 4.

FIG. 8 is a flowchart showing a flow of processing (image displaying method) performed by the CPU 706 in an MF mode.

When the processing is started at Step S801, at Step S802, the CPU 706 converts a signal from the image pickup element 701 into a digital signal by the A/D converter 702 to store it in the memory 703. The data stored in the memory 703 contains a mixture of an A image pixel signal from an A image pixel group, a B image pixel signal from a B image pixel group, and a RGB pixel signal from an image pickup pixel group.

At Step S803, the CPU 706 picks up the A and B image pixel signals from the data stored in the memory 703 to form A and B image data respectively corresponding to A and B images.

At Step S804, the CPU 706 interpolates data of colors that should be originally located in positions of the A and B image pixels from pixel values of surrounding image pickup pixels. This way, the CPU 706 forms a pixel-interpolated RGB pixel signal.

At Step S805, the CPU 706 processes the RGB pixel signal to form a color display image that is a normal image pickup image.

At Step S806, the CPU 706 determines whether or not a current routine is a timing (period) of highlighting. The CPU 706 proceeds to Step S806 if the routine is the timing of highlighting. The CPU 706 proceeds to Step S808 if the routine is not the timing of highlighting. The CPU 706 determines whether or not the routine is the timing of highlighting by a timer incorporated therein.

Subsequently, at Step S807, the CPU 706 determines a pixel (object area) in which an displacement amount (absolute value) between the A and B images of the A and B image data is larger than a predetermined threshold value. For the pixel having the displacement amount larger than the predetermined threshold value, the CPU 706 overwrites a corresponding pixel of the color display image formed at Step S805 with a color for highlighting.

At Step S808, the CPU 706 transfers the color display image formed at Step S805 or the color display image whose partial pixel has been overwritten with the specific color for highlighting at Step S807 to the display memory 704. The CPU 706 transfers the color display image written in the display memory 704 by a predetermined timing to the display device 705 to display it.

Thus, in the Embodiment, on the normal color display image, the object area in which the displacement amount between the A and B images is large is highlighted. As a result, Embodiment 4 enables a user to clearly recognize the object area having a large defocus amount without displaying any double image.

Repeated execution of Steps S802 to S808 results in repetition of turning ON/OFF of highlighting to enable flash highlighting.

As in the case of Embodiment 3, Embodiment 4 enables highlighting of an object area in which a difference in displacement amount between the A and B images is smaller than a threshold value.

Each embodiment has been described by way of case in which the single image pickup element includes the pixel group for photoelectrically converting the A and B images formed by the light fluxes pupil-divided by the microlens and the image pickup pixel group for photoelectrically converting the object image formed by the light flux not subjected to pupil-division. However, the present invention may use an image pickup element that includes an image pickup pixel group and another image pickup element that includes a pixel group for photoelectrically converting the A and B images. In other words, the present invention requires use of at least one image pickup element.

A direction of pupil-division is not limited to the left-and-right direction or the up-and-down direction. It may be an oblique direction.

Embodiment 5

Figure 9:
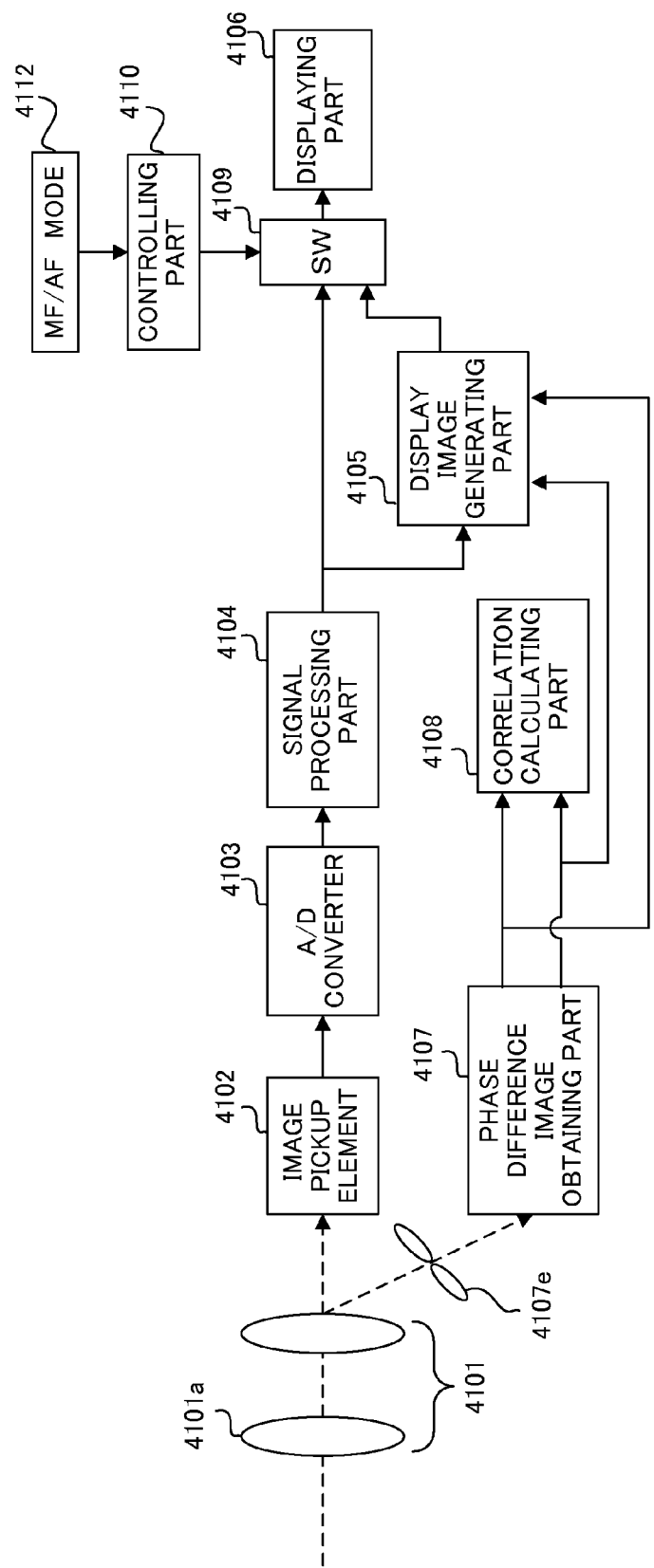
FIG. 9 is a block diagram showing a configuration of a camera that is Embodiment 5 of the present invention.

FIG. 9 shows a configuration of a digital camera (image pickup apparatus) that is Embodiment 5 of the present invention. Digital cameras include a digital still camera and a video camera. A case of the digital still camera will be described.

In FIG. 9, reference numeral 4101 denotes an image pickup optical system that includes a focus lens 4101a. The image pickup optical system 4101 may be detachably attached to a camera main body (not shown) as an interchangeable lens, or integrated with the camera main body.

Reference numeral 4102 denotes an image pickup element constituted of a CCD sensor, a CMOS sensor, or the like, and photoelectrically converts an object image (third object image) formed by a light flux from the image pickup optical system 4101.

Reference numeral 4103 denotes an A/D converter that converts an analog signal output from the image pickup element 4102 into a digital signal.

Reference numeral 4104 denotes a signal processing part that performs signal processing such as color conversion processing for the digital signal output from the A/D converter 4013 to generate an image signal displayable in a displaying part 4106 constituted of a LCD or the like.

Reference numeral 4105 denotes a display image generating part for generating a focus guide image by using A and B image data (first image and second image) described below, and an image signal (real image: third image) from the signal processing part 4104. An operation of the display image generating part 4105 will be described below.

Reference numeral 4109 denotes a switch for switching an image signal output to the displaying part 4106 between an output of the signal processing part 4104 and an output of the display image generating part 4105.

Reference numeral 4107 denotes a phase difference image obtaining part that pupil-divides a light flux from the image pickup optical system 4101 into two light fluxes (first and second light fluxes), and forms two images (first and second object images: hereinafter referred to as A and B images) by the two light fluxes. The A and B images are photoelectrically converted to generate A and B image data respectively corresponding to the A and B images. A configuration of the phase difference image obtaining part 4107 will be described below.

The image pickup element 4102, the A/D converter 4103, the signal processing part 4104, and the phase difference image obtaining part 4107 constitute an image obtaining part. The display image generating part 4105 and a controlling part 4110 described below constitute a processing part.

Figure 21:
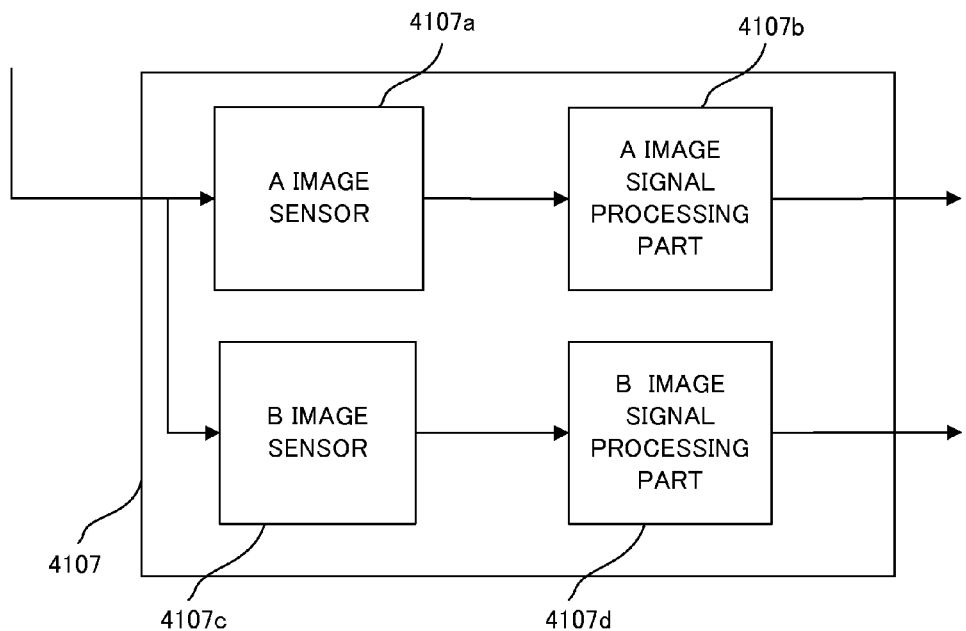
FIG. 21 is a view showing a configuration example of a phase difference obtaining part of Embodiment 6.

Referring to FIG. 21, a configuration example of the phase difference image obtaining part 4107 will be described. In FIG. 21, reference numerals 4107a and 4107c respectively denote A and B image sensors, each of which is constituted of one or two image pickup elements different from the image pickup element 4102 described above. A and B image light fluxes (first and second light fluxes) that are parts of a light flux from the image pickup optical system 4101 and pupil-divided by a pupil-division lens (pupil divider) 4107e shown in FIG. 9 enter the A and B image sensors 4107a and 4107c. On the A and B image sensors 4107a and 4107c, an A image by an A image light flux and a B image by a B image light flux are formed. The A and B images have a phase difference corresponding to a defocus amount when the image pickup optical system 4101 is in an out-of-focus state. The A and B image sensors 4107a and 4107c photoelectrically converts the A and B images respectively.

Reference numerals 4107b and 4107d respectively denote A and B image signal processing parts. The A image signal processing part 4107b converts an analog signal output from the A image sensor 4107a into a digital signal, and executes predetermined processing for the converted signal to generate A image data corresponding to the A image. The B image signal processing part 4107*d* converts an analog signal output from the B image sensor 4107*c* into a digital signal, and executes predetermined processing for the converted signal to generate B image data corresponding to the B image.

In FIG. 9, reference numeral 4108 denotes a correlation calculating part for calculating a phase difference between the A and B images output from the phase difference image obtaining part 4107 by correlation calculation. The calculated phase difference corresponds to a defocus amount of the image pickup optical system 4101, and is accordingly used for automatic focus control. Specifically, the defocus amount of the image pickup optical system 4101 is calculated from the phase difference, and a driving amount up to a focus position of the focus lens 4101*a* is calculated based on the defocus amount. The focus lens 4101*a* is controlled to move by the driving amount.

Reference numeral 4110 denotes a controlling part for controlling the switch 4109 as described below.

Figure 10:
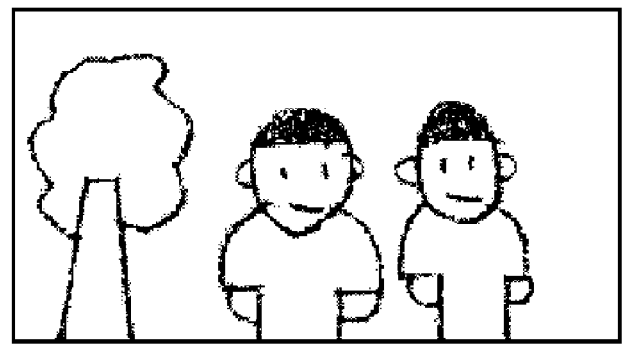
FIG. 10 is a view showing a real image of each Embodiment.

Referring to FIGS. 10 to 13, processing in the display image generating part 4105 will be described. FIG. 10 shows a real image that is a normal image pickup image generated by the signal processing part 4104 based on a signal from the image pickup element 4102.

Figure 11:
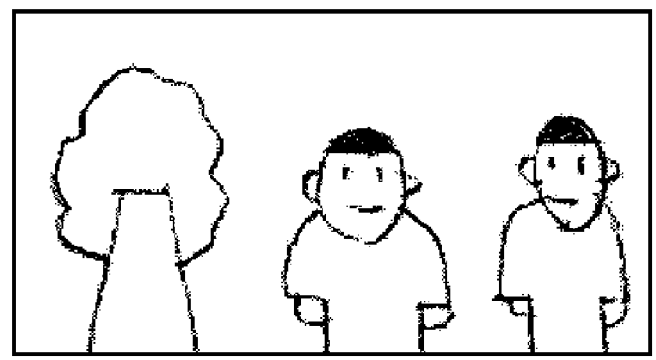
FIG. 11 is a view showing an A image (A image data) of each Embodiment.
Figure 12:
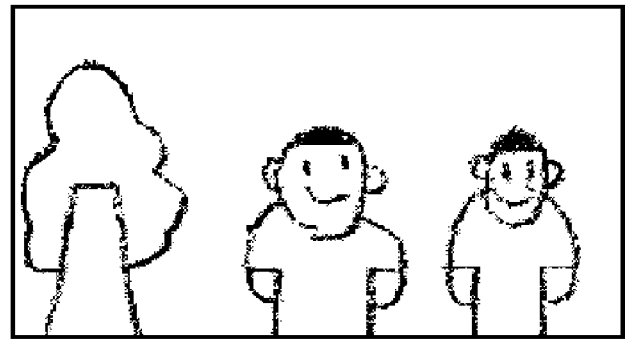
FIG. 12 is a view showing a B image (B image data) of each Embodiment.

FIGS. 11 and 12 respectively show A and B image data corresponding to A and B images generated by the phase difference image obtaining part 4107. When the image pickup optical system 4101 is in an out-of-focus state, as compared with the real image, the A image of the A image data is shifted right, and the B image of the B image data is shifted left. The display image generating part 4105 generates a focus guide image (focus support image or focus assist image) by using the A and B image data.

The focus guide image can be generated as a superimposed image (double image) of A and B image data by executing alpha blending to translucent-synthesize (superimpose) the A and B image data by using a coefficient ($\alpha$). The alpha blending is performed by the following expression (1):

$$O(x,y)=A(x,y)\times\alpha+B(x,y)\times(1-\alpha) \quad (1)$$

O(x, y): superimposed image (double image)
A(x, y): A image data
B(x, y): B image data
$\alpha$: weighted coefficient (transmittance information)
(x, y): coordinates of pixel Another focus guide image can be generated as a superimposed image (double image) by superimposing a differential image that is an image indicating an absolute value of a difference (displacement amount) between the A image (A image data) and the B image (B image data) on the real image.

First, a differential image indicating a difference between the A and B images input by the display image generating part 4105 is calculated by the following expression (2):

$$O(x,y)=|A(x,y)-B(x,y)| \quad (2)$$

O(x, y): differential image
A(x, y): A image data
B(x, y): B image data

Figure 14:
FIG. 14 is a view showing a differential image (binary image) of Embodiment 5.

Next, the differential image obtained by the expression (2) is subjected to binarization processing to generate a binary image indicating an out-of-focus area (white area) as shown in FIG. 14.

Figure 13:
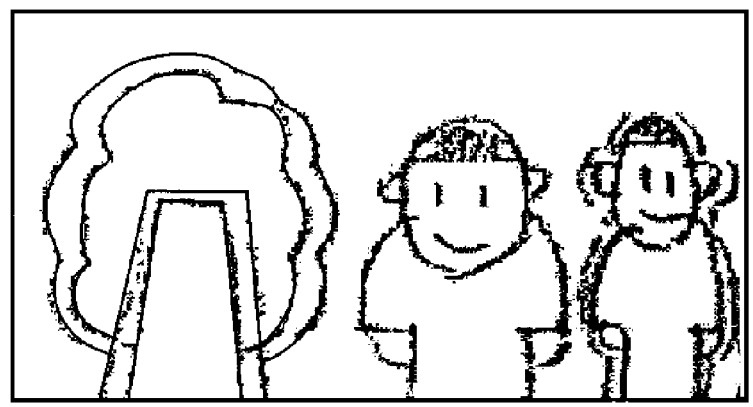
FIG. 13 is a view showing a double image of Embodiment 5.
Figure 15A:
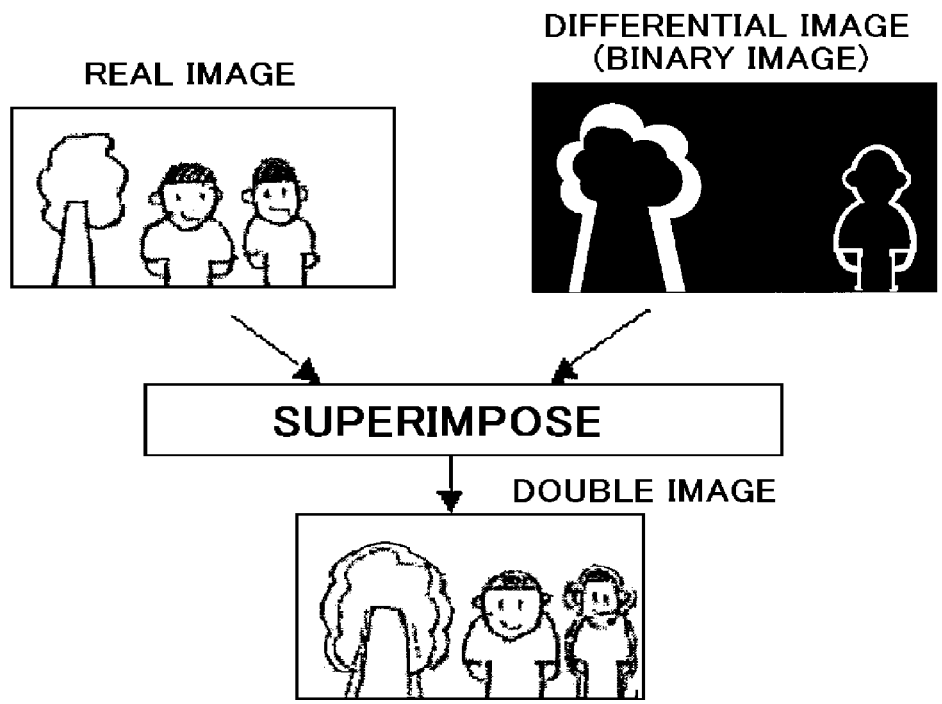
FIG. 15A is a view showing a generation flow of a double image of Embodiment 5.

The binary image (out-of-focus area, in other words, a difference between the A and B images) is superimposed on the real image of FIG. 10 to generate a double image shown in FIG. 13. FIG. 15A shows a flow of double image generation processing using the differential image described above.

The embodiment has been described by way of case in which the double image is generated by using the A and B image data. However, a double image may be generated by using the real image and the A image data, or the real image and the B image data.

In FIG. 9, reference numeral 4112 denotes a focus mode switch that enables the user to select one of a manual focus (MF) mode and an automatic focus (AF) mode. If the AF mode is selected, the controlling part 4110 sets the switch 4109 to the signal processing part 4104 side to output the real image to the displaying part 4106. The displaying part 4106 accordingly displays only the real image.

If the MF mode is selected, the controlling part 4110 sets the switch 4109 to the display image generating part 4105 side to output a superimposed image (double image) as a focus guide image to the displaying part 4106. Thus, the focus guide image is displayed by the displaying part 4106, and the user can perform a manual focusing operation by viewing this focus guide image. When the MF mode is selected, the focus guide image may be displayed on condition that a focus guide switch (not shown) is operated.

Figure 15B:
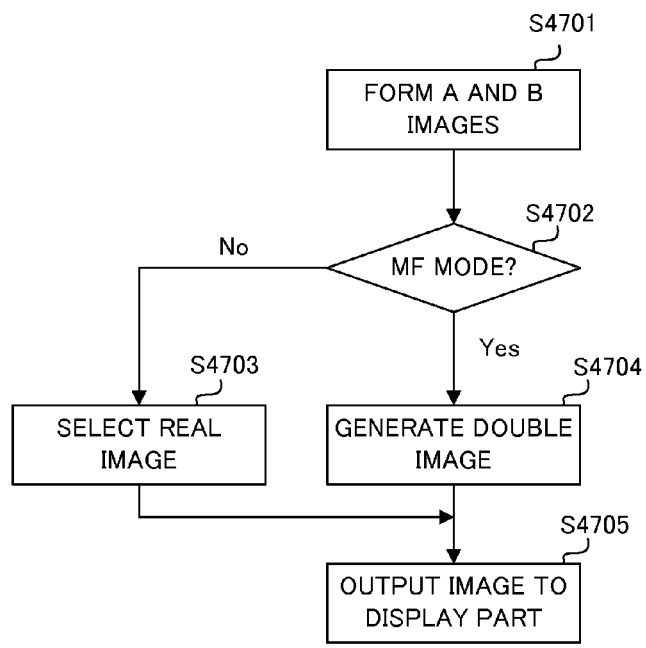
FIG. 15B is a flowchart showing a generation procedure of a double image in Embodiment 5.

FIG. 15B is a flowchart showing a flow of processing (image displaying method) from obtaining of the A and B images to displaying of the double image, which is common to the use of the alpha blending and the use of the differential image.

At Step S4701, the controlling part 4210 causes the phase difference image obtaining part 4107 to generate A and B image data.

At Step S4702, the controlling part 4210 determines whether or not the focus mode switch 4112 has selected the MF mode (or whether or not the focus guide switch has been operated). If the MF mode has not been selected (AF mode has been selected), the controlling part 4210 proceeds to Step S4703. If the MF mode has been selected (or the focus guide switch has been operated), the controlling part 4210 proceeds to Step S4704.

At step S4703, the controlling part 4210 sets the switch 4109 to the signal processing part 4104 side to select displaying of the real image.

At Step S4704, the controlling part 4210 causes the display image generating part 4105 to generate a double image. The controlling part 4210 sets the switch 4109 to the display image generating part 4105 side.

At Step S4705, the real image or the double image is output to the displaying part 4106 to be displayed.

The embodiment enables displaying of a double image easily understood visually as a focus guide image.

Though not shown, the A and B images are displayed in the state of matching each other in an object area on which the image pickup optical system 4101 is focused on the double image. Thus, when wishing to focus on an object area of an out-of-focus state, the user can intuitively determine in which of directions he should perform a manual focusing operation based on a distance of the object area near or far from the object area of the in-focus state.

Embodiment 6

Figure 16:
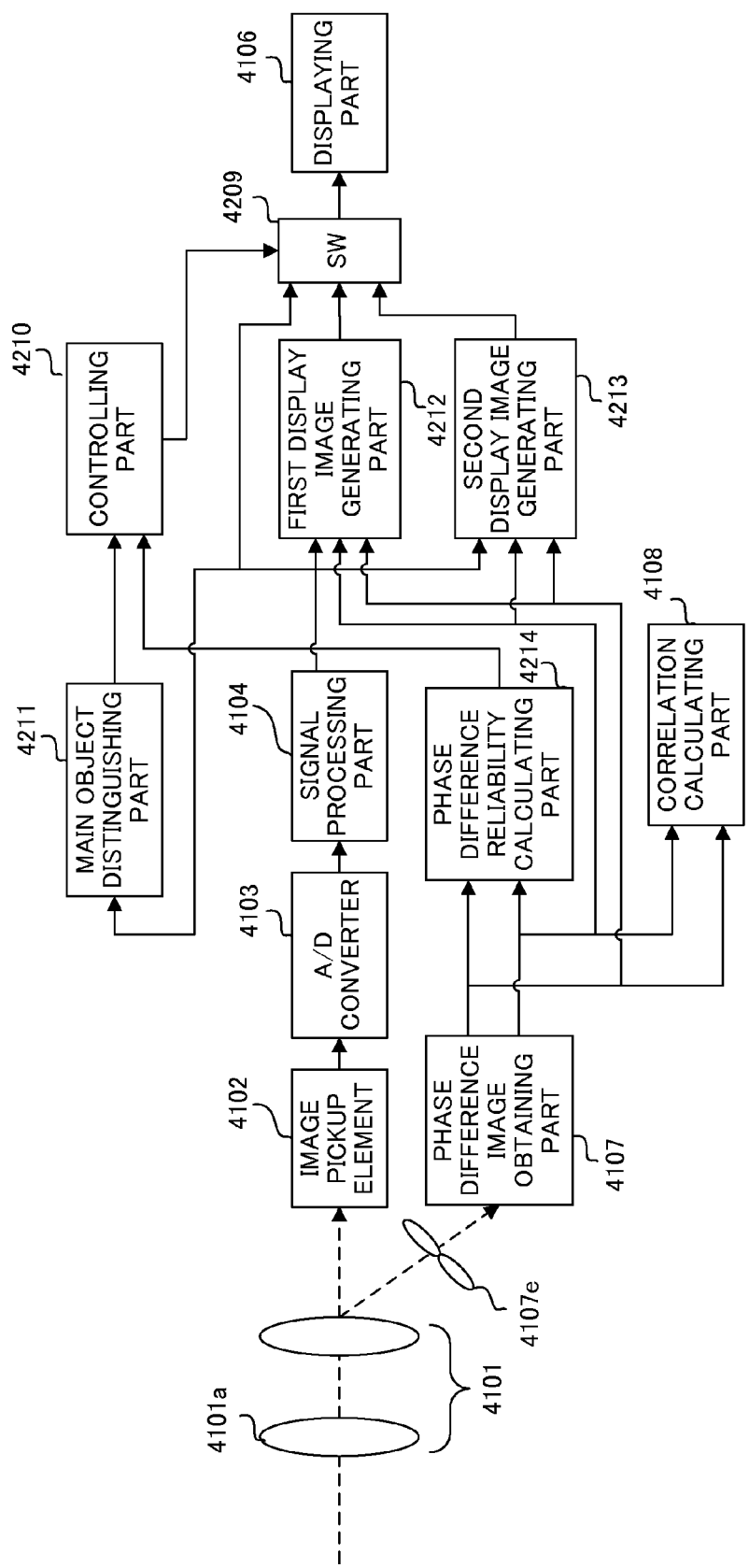
FIG. 16 is a block diagram showing a configuration of a camera that is a sixth embodiment of the present invention.

FIG. 16 shows a configuration of a camera that is Embodiment 6 of the present invention. The camera of the embodiment can generate first and second focus guide images different from each other, and selectively display them. In FIG. 16, components similar to those of the camera of Embodiment 5 (FIG. 9) are denoted by similar reference numerals, and description thereof will be omitted.

In FIG. 16, reference numeral 4212 denotes a first display image generating part (first image generating part). The first display image generating part 4212 generates a first focus guide image that is a superimposed image by using A image data (first image) and B image data (second mage) from a phase difference obtaining part 4107 and a real image (third image) from a signal processing part 4104.

Reference numeral 4213 denotes a second display image generating part (second image generating part) for generating a second focus guide image different from the first focus image guide by using A and B image data. The second focus guide image will be described below.

Reference numeral 4209 denotes a switch for switching an image to be displayed by a displaying part 4106 among the real image from the signal processing part 4104, the first focus guide image from the first display image generating part 4212, and the second focus guide image from the second display image generating part 4213.

Reference numeral 4211 denotes a main object distinguishing part for extracting presence of characteristics of a main object from data of the real image that is an output of the signal processing part 4104 to output its extraction result (distinguishing result). The main object is distinguished by user's selection operation or the camera automatically.

Reference numeral 4214 denotes a phase difference reliability calculating part (reliability calculating part) for calculating a reliability of a phase difference between A and B images based on image signals of the A and B images output from the phase difference obtaining part 4107 to output its calculation result. This phase difference reliability calculating part 4214 is used in Embodiment 7 described below.

Reference numeral 4210 denotes a controlling part (controller). The controlling part 4210 determines which of the real image, the first focus guide image, and the second focus guide image is displayed on the displaying part 4106 based on an output result from the main object distinguishing part 4211 or the phase difference reliability calculating part 4214. The controlling part 4210 changes the switch 4209 according to a result of the determination.

Figure 19:
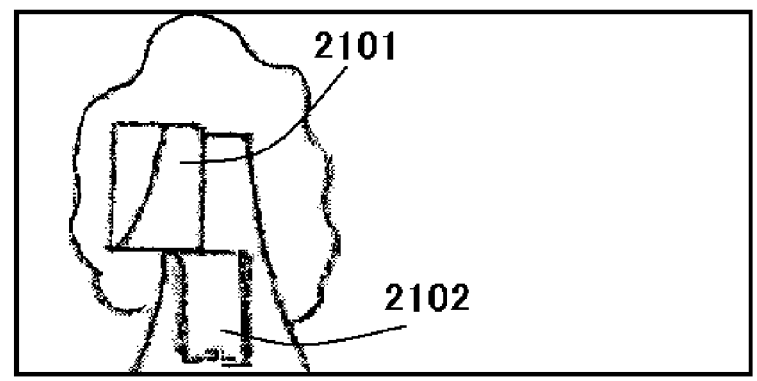
FIG. 19 is a view showing an example of a split image displayed on an object other than the face in Embodiment 6.
Figure 20:
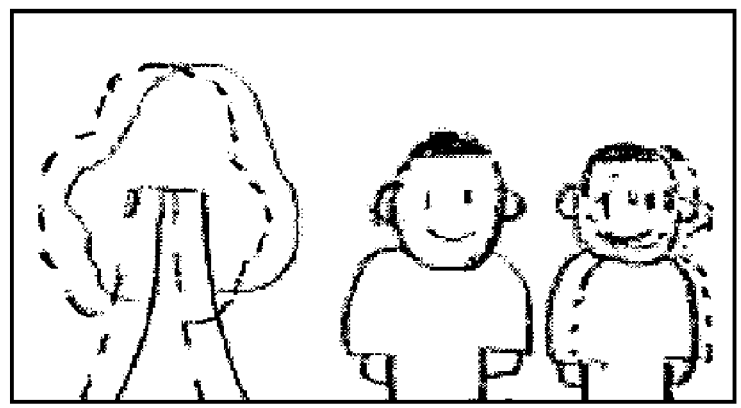
FIG. 20 is a view showing an example of a double image displayed in Embodiment 6.

The second focus guide image will be described. As a focus guide image, an image equivalent to a split image (hereinafter referred to as a split image) disclosed in Japanese Patent Laid-Open No. 2001-309210 is available. As shown in FIG. 19, when an outline of a main object ("tree" in this case) is clear, the use of the split image realizes easier focusing than the use of the double image (FIG. 20) of Embodiment 5.

Figure 26:
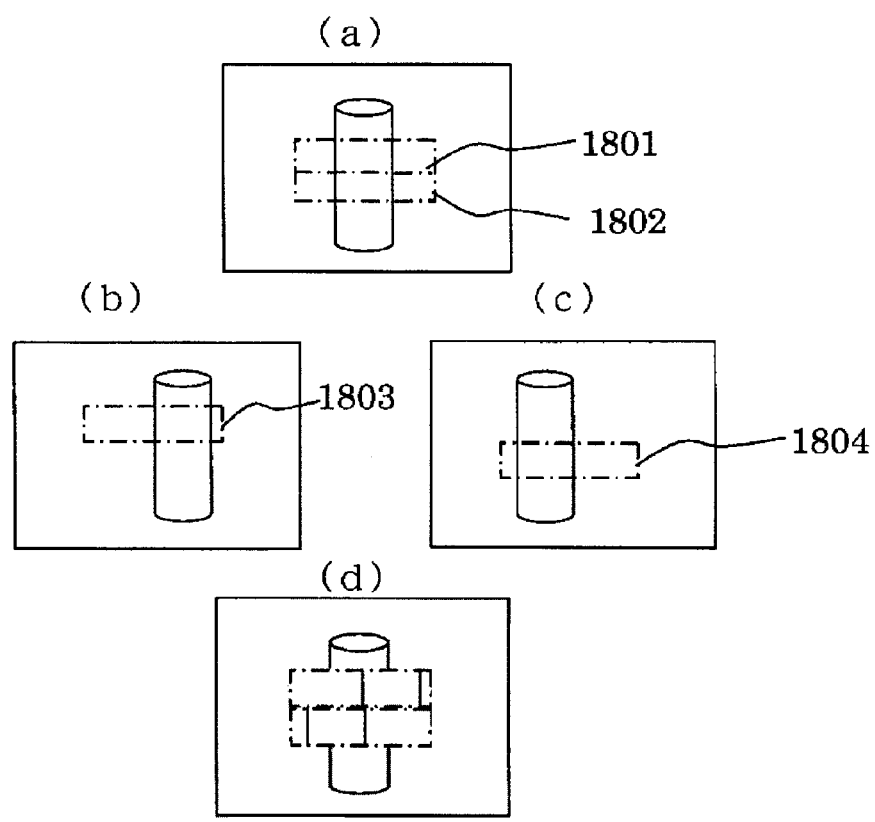
FIG. 26 is a view showing an example of a split image generated in Embodiment 6.

Referring to FIG. 26, the split image will be described. In FIG. 26, (a) indicates a real image in which a "bar" is a main object, (b) and (c) respectively indicate A and B image data, and (d) indicates a split image. The split image is generated by combining, in an up-and-down direction, selected from the A and B image data, images of object areas 1803 and 1804 located in the same position in a left-and-right direction and in adjacent positions in the up-and-down direction. By inserting (overwriting) the split image into areas corresponding to the object areas 1803 and 1804 of the A and B image data of the real image, the split image can be displayed in the real image.

Figure 18:
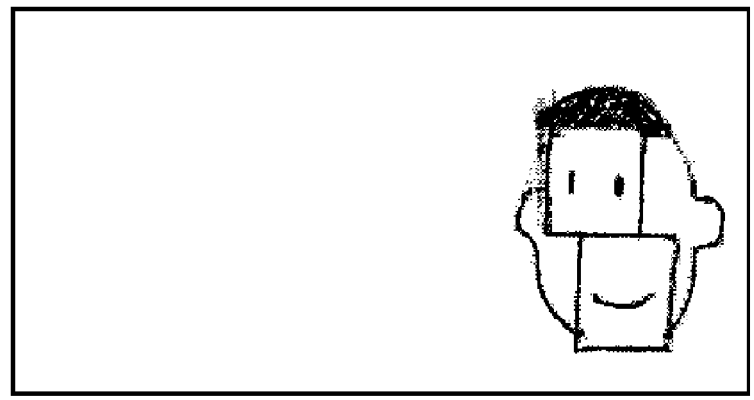
FIG. 18 is a view showing an example of a split image displayed on a face in Embodiment 6.

However, as shown in FIG. 18, if an outline of the main object such as a human face is not clear, focusing is difficult by the split image. Cutting of the face by the split image is not favorable visually.

Thus, in the embodiment, the main object distinguishing part 4211 distinguishes whether or not a main object is a face. A double image is selected as a focus guide image if the main object is a face, and a split image is selected as a focus guide image if the main object is not a face. In other words, the main object distinguishing part 4211 is a face detection part that extracts presence of characteristics (both eyes, a mouth, and the like) of the face from the real image data to distinguish whether or not the main object is a face.

When the main object distinguishing part 4211 distinguishes a face, the controlling part 4210 sets the switch 4209 to select the first display image generating part 4212, and displays a first focus guide image (double image) on the displaying part 4106. When the main object distinguishing part 4211 distinguishes the face, the controlling part 4210 sets the switch 4209 to select the second display image generating part 4213, and displays a second focus guide image (split image) on the displaying part 4106.

Figure 17:
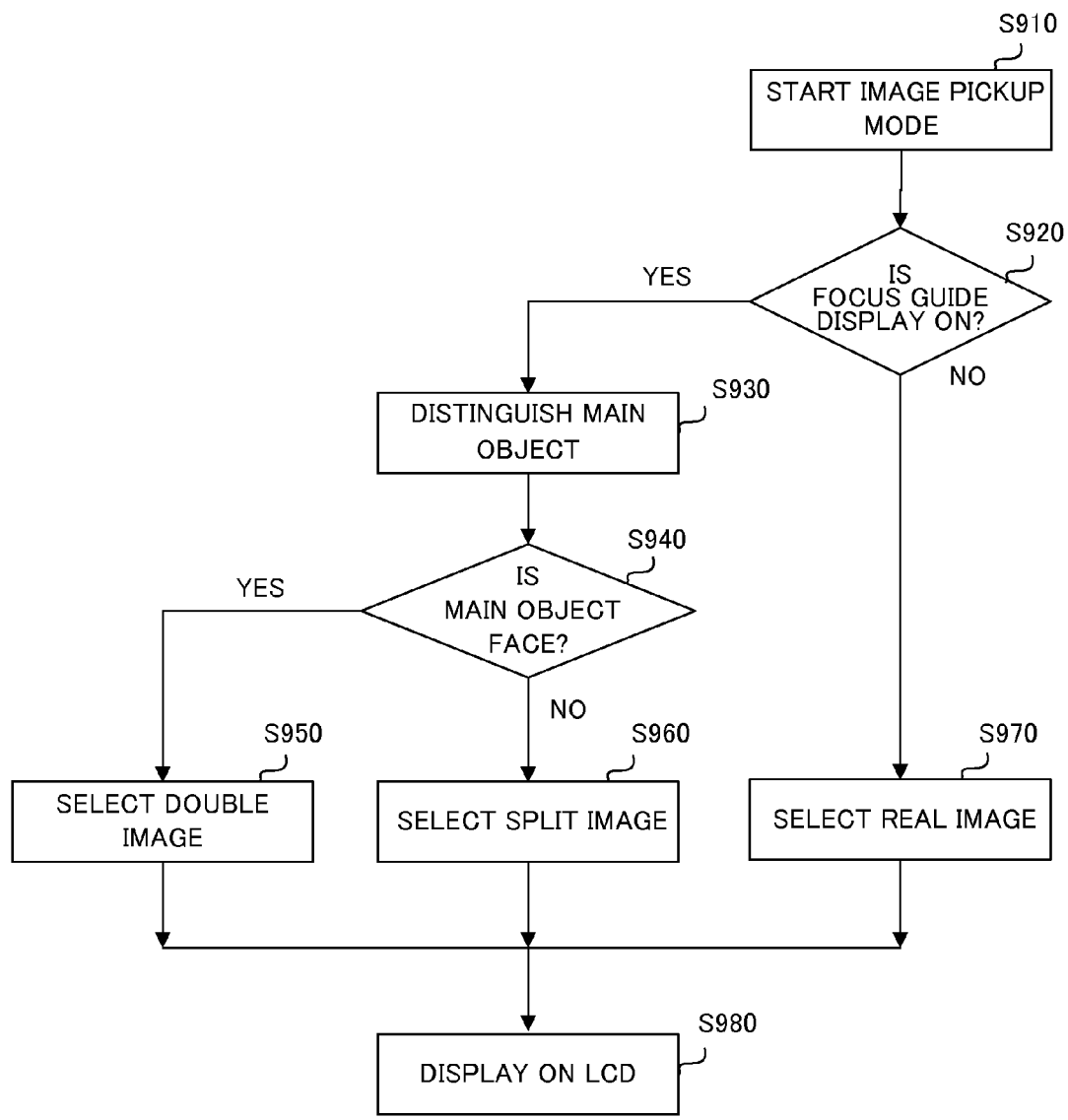
FIG. 17 is a flowchart showing a processing procedure of Embodiment 6.

Referring to a flowchart of FIG. 17, a flow of processing (image displaying method) concerning switching of a focus guide image will be described. This processing is performed according to a computer program stored in the controlling part 4210.

When an image pickup mode is started at Step S910, the controlling part 4210 proceeds to Step S920 to determine whether or not to display a focus guide image. This determination is made based on whether or not a focus mode is a MF mode, or whether or not the focus guide switch has been operated as described above in Embodiment 5. If no focus guide image is displayed, the controlling part 4210 proceeds to Step S970, and sets the switch 4209 to output a real image from the signal processing part 4104 to the displaying part 4106. Then, proceeding to Step S980, the controlling part 4210 causes the displaying part 4106 to display the real image.

If a focus guide image is displayed, the controlling part 4210 proceeds to step S930, and causes the main object distinguishing part 4211 to distinguish a main object (face).

If a main object is distinguished to be a face at Step S940, the controlling part 4210 proceeds to Step S950. At Step S950, the controlling part 4210 sets the switch 4209 to output a double image from the first display image generating part 4212 to the displaying part 4106. Then, proceeding to Step S980, the controlling part 4210 causes the displaying part 4106 to display the double image.

If a main object is distinguished to be an object other than a face at Step S940, the controlling part 4210 proceeds to step S960. At Step S960, the controlling part 4210 sets the switch 4209 to output a split image from the second display image generating part 4213 to the displaying part 4106. Then, proceeding to Step S980, the controlling part 4210 causes the displaying part 4106 to display the split image.

Thus, the embodiment enables switching and displaying of a focus guide image for facilitating focusing according to the distinguishing result of the main object.

The embodiment has been described by way of case in which the focus guide image is switched according to the distinguishing result of the main object. However, the switching condition of the focus guide image is not limited to the distinguishing result of the main object. Focus guide displaying may be switched according to user's operation of an operation member such as a switch.

The switchable focus guide images are not limited to the double image and the split image. Three or more switchable focus guide images may be provided.

According to the distinguishing result of the main object (if the main object is a face), displaying of the split image may be stopped to switch to displaying of a real image.

Embodiment 7

Next, as Embodiment 7 of the present invention, a modified example of Embodiment 6 will be described. A configuration of a camera of the embodiment is similar to that of Embodiment 6.

When contrast of an object area of a focusing target is low, it is difficult to accurately obtain a phase difference generated between A and B images by a phase difference obtaining part 4107. This difficulty will be described referring to FIGS. 24 and 25, and a reliability of a phase difference will be described.

Figure 24:
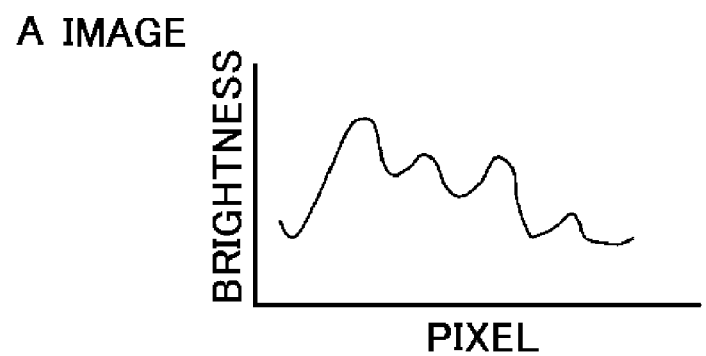
FIG. 24 is a view showing brightness of A and B images when object contract is high in Embodiment 7.
Figure 24:
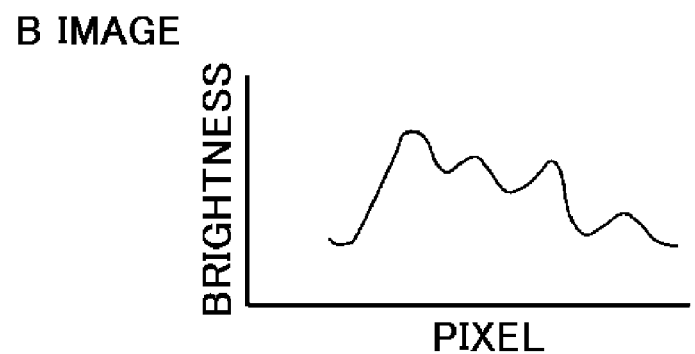
Figure 25:
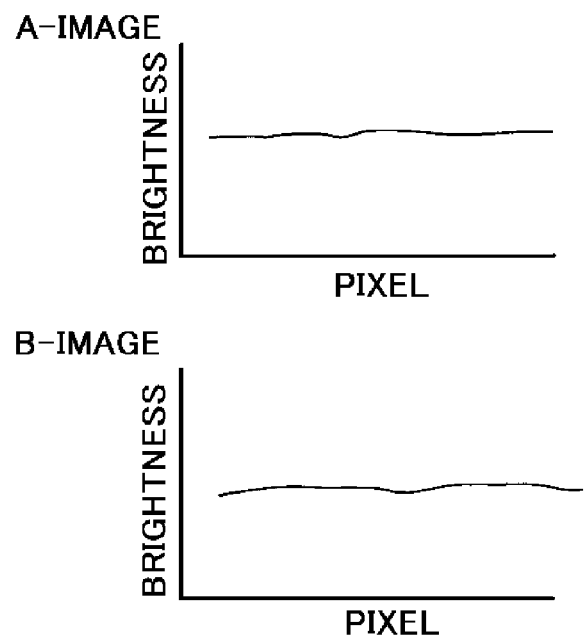
FIG. 25 is a view showing brightness of A and B images when object contrast is low in Embodiment 7.

FIG. 24 shows an example of brightness (ordinate) of A and B images when contrast of an object area is high and an edge is clear. FIG. 25 shows an example of brightness of A and B images when contrast of an object area is low. In both drawings, an abscissa indicates a pixel position.

If contrast is high as shown in FIG. 24, executing correlation calculation enables obtaining of a phase difference between A and B images. On the other hand, if contrast is low as shown in FIG. 25, calculation of a phase difference is difficult. A value indicating a level that enables accurate calculation of the phase difference will be referred to as a reliability of a phase difference. More specifically, a reliability of a phase difference is determined based on a difference between a maximum value and a minimum value of brightness of the A and B images.

If a reliability of a phase difference is low, advisably, it is preferable that a focus guide image is generated by using a real image without using A or B image data. Thus, in the embodiment, according to a reliability of a phase difference, a focus guide image is switched between a split image (first focus guide image) generated by using the A and B image data and a partially enlarged image (second focus guide image) generated by using the real image.

Specifically, the first display image generating part 4212 shown in FIG. 16 generates a split image, and the second display image generating part 4213 generates a partially enlarged image. None of the A and B image data is used for generating the partially enlarged image. Thus, an input line of the A and B image data to the second display image generating part 4213 is unnecessary.

Then, according to a reliability of a phase difference calculated by the phase difference calculating part 4214, a focus guide image output through the switch 4209 to the displaying part 4106 is switched between the split image and the partially enlarged image.

The generation of a partially enlarged image will be described. First, in the real image shown in FIG. 10, the user designates (trims) an object area of a focusing target. Electronically enlarging the trimmed area by a predetermined magnification enables generation of a partially enlarged image 1502 shown in FIG. 23. The generated partially enlarged image 1502 is inserted (overwritten) into an arbitrary area of the real image to be displayed.

If a reliability of a phase difference is higher (or equal to or higher) than a predetermined value, the controlling part 4210 sets the switch 4209 so as to output the split image from the first display image generating part 4212 to the displaying part 4106. On the other hand, if a reliability of the phase difference is lower than the threshold value, the controlling part 4210 changes the switch 4209 so as to output the partially enlarged image from the second display image generating part 4213 to the displaying part 4106.

Figure 22:
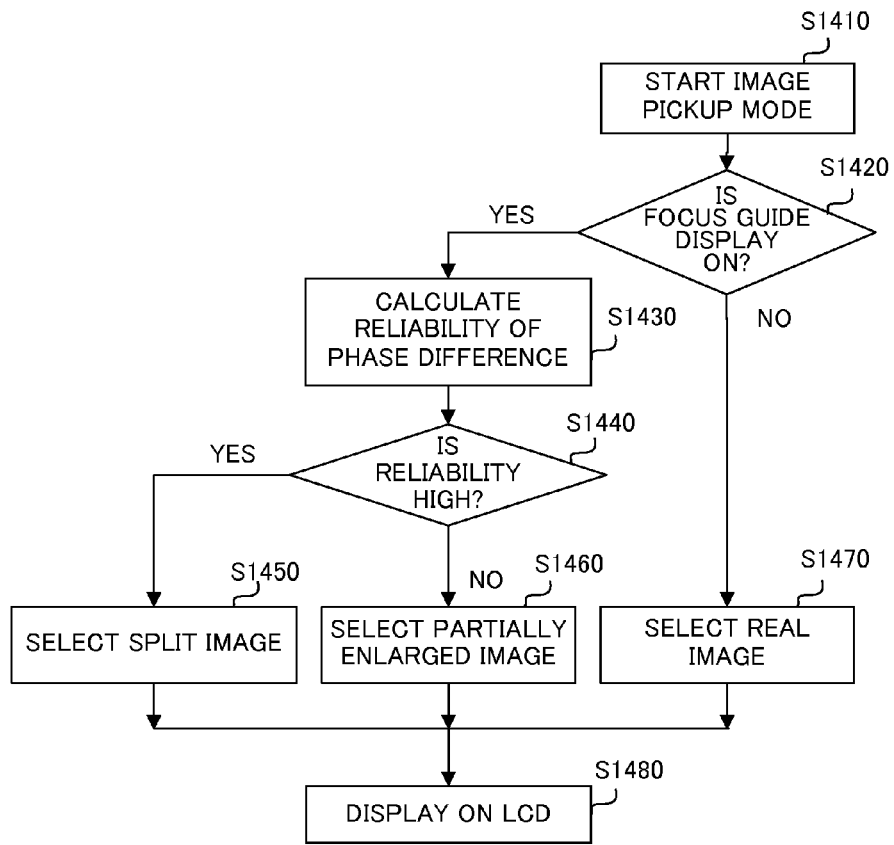
FIG. 22 is a flowchart showing a processing procedure of a camera that is Embodiment 7 of the present invention.

Referring to a flowchart of FIG. 22, a flow of processing (image displaying method) in the embodiment will be described below. This processing is performed by a computer program stored in the controlling part 4210.

When an image pickup mode is started at Step S1410, the controlling part 4210 proceeds to Step S1420 to determine whether or not to display a focus guide image. This determination is made based on whether or not a focus mode is an MF mode, or whether or not a focus guide switch has been operated as described above in Embodiment 5. If no focus guide image is displayed, proceeding to Step S1470, the controlling part 4210 sets the switch 4209 so as to output a real image from the signal processing part 4104 to the displaying part 4106. Then, proceeding to Step S1480, the controlling part 4210 causes the displaying part 4106 to display the real image.

On the other hand, if a focus guide image is displayed, the controlling part 4210 proceeds to Step S1430, and causes the phase difference reliability calculating part 4214 to calculate a reliability of a phase difference between A and B images.

At Step S1440, the controlling part 4210 determines whether or not the reliability of the phase difference is higher than a predetermined threshold value. Upon determining that the reliability is higher, the controlling part 4210 proceeds to Step S1450.

At Step S1450, the controlling part 4210 sets the switch 4209 so as to output a split image from the first display image generating part 4212 to the displaying part 4106. Then, at Step S1480, the controlling part 4210 causes the displaying part 4106 to display the split image.

If the reliability of the phase difference is determined to be lower than the threshold value, the controlling part 4210 proceeds to Step S1460. At Step S1460, the controlling part 4210 sets the switch 4209 so as to output a partially enlarged image from the second display image generating part 4213 to the displaying part 4106. Then, at Step S1480, the controlling part 4210 causes the displaying part 4106 to display the partially enlarged image.

According to the embodiment, since a reliability focus guide image of a phase difference is switched to another, a focus guide image suited to contrast of the object can be provided to the user.

The embodiment has been described by way of case in which a focus guide image is switched between a split image and a partially enlarged image according to a reliability of a phase difference. However, the focus guide image may be switched between the double image and the partially enlarged image described above in Embodiment 5.

Embodiment 8

Each of Embodiments 5 to 7 has been described by way of case in which the image pickup element for generating the real image and the image pickup element for generating the A and B image data are separately disposed. However, a single image pickup element that includes pixel groups for generating a real image and pixel groups for generating A and B image data may be used. In other words, the present invention requires use of at least one image pickup element. Such an image pickup element corresponds to the image pickup element shown in FIG. 2.

Embodiment 9

Each of Embodiments 1 to 4 has been described by way of case in which the image is displayed by adding the specific color to the area of the out-of-focus state or flashing the specific color. Each of Embodiments 6 to 8 has been described by way of case in which the displaying of plural types of focus guide images is switched. Embodiment 9 is directed to a case in which the configurations of the embodiments described above are combined to be implemented. Embodiment 9 enables focus guide displaying more easily understandable visually to a user.

Figure 27:
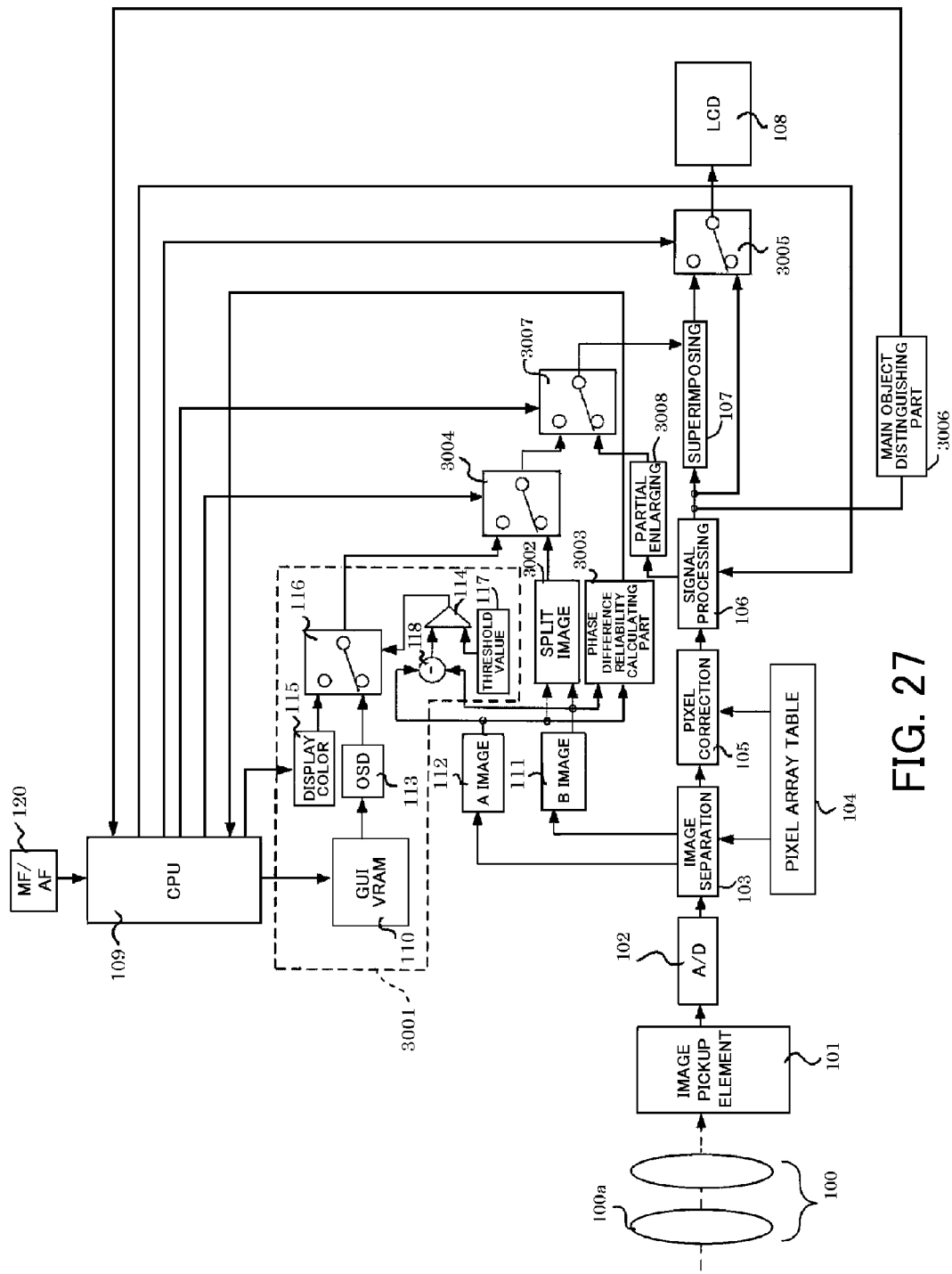
FIG. 27 is a block diagram showing a configuration of a camera that is Embodiment 9 of the present invention.

FIG. 27 shows a configuration of a digital camera (image pickup apparatus) that is Embodiment 9 of the present invention. Digital cameras include a digital still camera and a video camera. In this case, only the digital still camera will be described. In the embodiment, components similar to those of Embodiment 1 shown in FIG. 1 are denoted by similar reference numerals, and description thereof will be omitted.

Reference numeral 3001 denotes a highlight image generating part that includes a GUI VRAM 110, a highlight display color output part 115, an OSD circuit 113, a switch 116, a subtractor 118, a threshold value memory 117, and a comparator 114. The highlight image generating part 3001 generates a highlight image (double image including an area of a highlight display color shown in a lower side of FIG. 4) that is a focus guide image.

Reference numeral 3002 denotes a split image generating part. The split image generating part 3002 receives A and B image video signals (A image data: first image, and B image data: second image) from A and B image holding circuits 112 and 111 to generate split images that are other split images.

Reference numeral 3008 denotes a partially enlarged image generating part that receives a video signal indicating a normal image pickup image (third image: real image hereinafter) from a signal processing part 106 to generate a partially enlarged image that is yet another focus guide image.

Reference numeral 3006 denotes a main object distinguishing part for distinguishing whether or not a main object included in the real image is a face. The main object distinguishing part 3006 outputs "0" if the main object is a face, and "1" if the main object is not a face. The embodiment is directed to the case of distinguishing whether or not the main object is a face. However, the main object distinguishing part 3006 may distinguish whether or not the main object is an object other than a face.

Reference numeral 3003 denotes a phase difference reliability calculating part for calculating a reliability of a phase difference between A and B images as described above in Embodiment 7.

Reference numerals 3004 and 3007 denote switches for switching focus guide images to be output to a superimpose synthesizing circuit 107. The switch 3004 is changed to "0" by a CPU 109 if an output of the main object distinguishing part 3006 is "0", and is changed to "1" by the CPU 109 if the output of the main object distinguishing part 3006 is "1". The switch 3007 is changed to "0" by the CPU 109 if an output of the phase difference reliability calculating part 3003 is "0" described below, and to "1" by the CPU 109 if an output of the phase difference reliability calculating part 3003 is "1" described below.

The superimpose synthesizing circuit 107 synthesizes a real image from the signal processing part 106 with an OSD video signal or a highlight display signal from the switch 116 or one of a split image and a partially enlarged image from the switches 3004 and 3007 by superimposing. The synthesized image is displayed by a display device 108.

Reference numeral 3005 denotes a switch for switching an output to the display device 108 between the real image from the signal processing part 106 and a real image having a focus guide image superimposed thereon from the superimpose synthesizing circuit 107. The CPU 109 outputs only the real image from the signal processing part 106 to the display device 108 via the switch 3005 if a focus mode switch 120 selects an AF mode. If a MF mode is selected, the CPU 109 outputs the image formed by superimposing the focus guide image on the real image from the superimpose synthesizing circuit 107 to the display device 108 via the switch 3005.

When the MF mode is selected, the focus guide image may be displayed on condition that a focus guide switch (not shown) is operated.

The user may switch the focus guide image to a favorite focus guide displaying manually by an operation switch (not shown) or the like.

Referring to flowcharts of FIGS. 27 and 28, configurations and operations (image displaying methods) of an image obtaining system (image obtaining part) including the image pickup element 101 and an image processing system (processing part) of the embodiment will be described. The flowchart of FIG. 28 shows an operation when the MF mode is selected.

In the image obtaining system shown in FIG. 27, a light flux from the image pickup optical system 100 forms an object image on the image pickup element 101. An analog signal from the image pickup element 101 that has photoelectrically converted the object image is converted into a digital signal (pixel signal) by an A/D converter 102.

Figure 28:
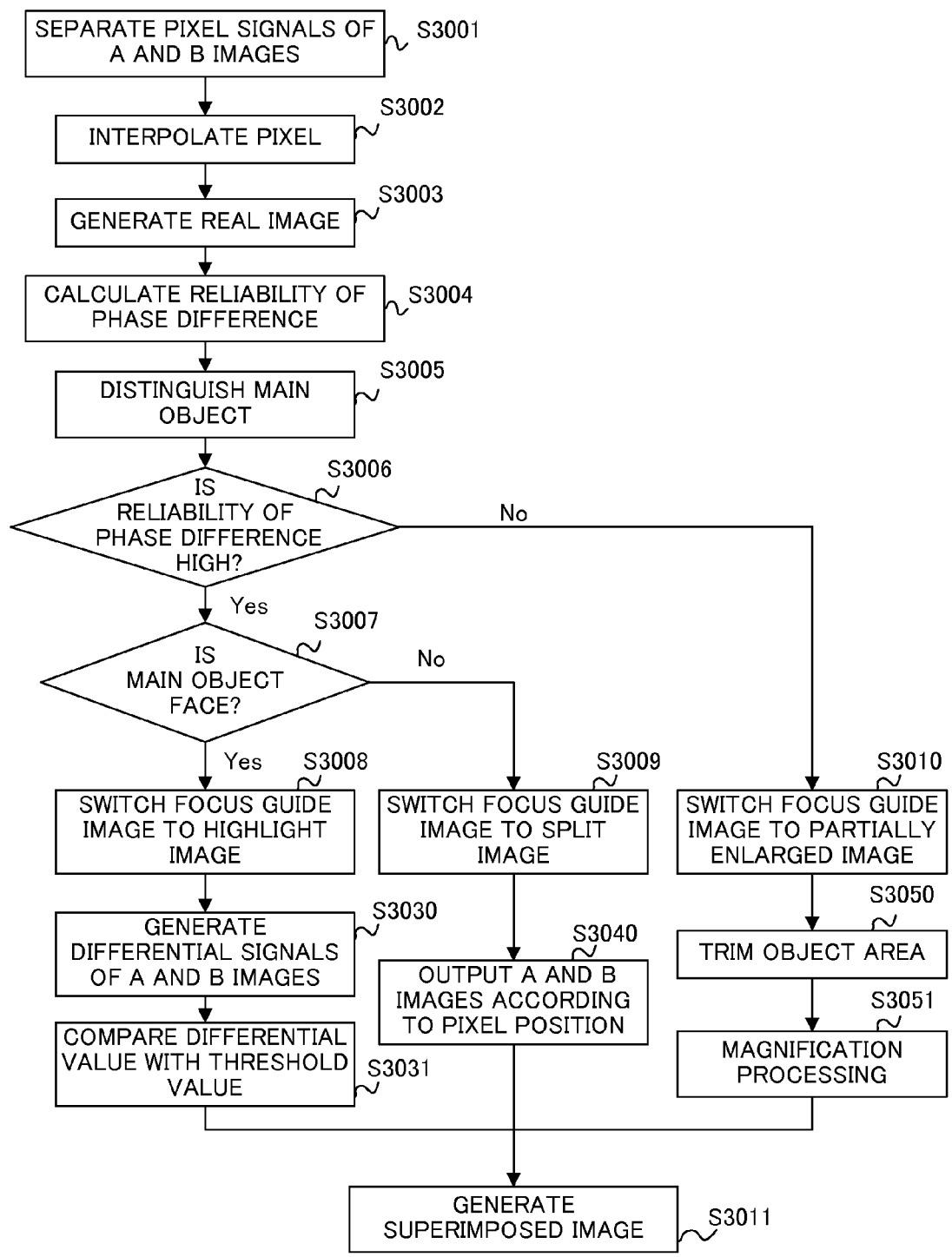
FIG. 28 is a flowchart showing an operation flow of the camera of Embodiment 9.

At Step S3001 in FIG. 28, an image separating circuit 103 separates pixel signals of an A image pixel group 201, a B image pixel group 202, and an image pickup pixel group 102 from the pixel signal output from the A/D converter 102 by referring to a pixel array table. The image separating circuit 103 outputs the pixel signal of the A image pixel group 201 to an A image holding circuit 112, and the pixel signal of the B image pixel group 202 to a B image holding circuit 111. The image separating circuit 103 outputs the pixel signal of the image pickup pixel group 203 to a pixel correcting circuit 105.

At Step S3002, as in the case of Embodiment 1, the pixel correcting circuit 105 interpolates pixel values of A and B image pixels by using pixel signals from image pickup pixels arranged around the A and B image pixels by referring to the pixel array table. This way, the pixel correcting circuit 105 outputs a pixel signal obtained by interpolating a pixel in the pixel signal output from the image pickup pixel group 203.

At Step S3003, the signal processing circuit 106 processes the pixel signal from the pixel correcting circuit 105 in various ways, and generates a video signal indicating a real image based on the pixel signal from the image pickup pixel group 203.

Next, the image processing system will be described. At Step S3004, the phase difference reliability calculating part 3003 calculates a reliability of a phase difference. The reliability of the phase difference is as described in Embodiment 7.

Figure 29:
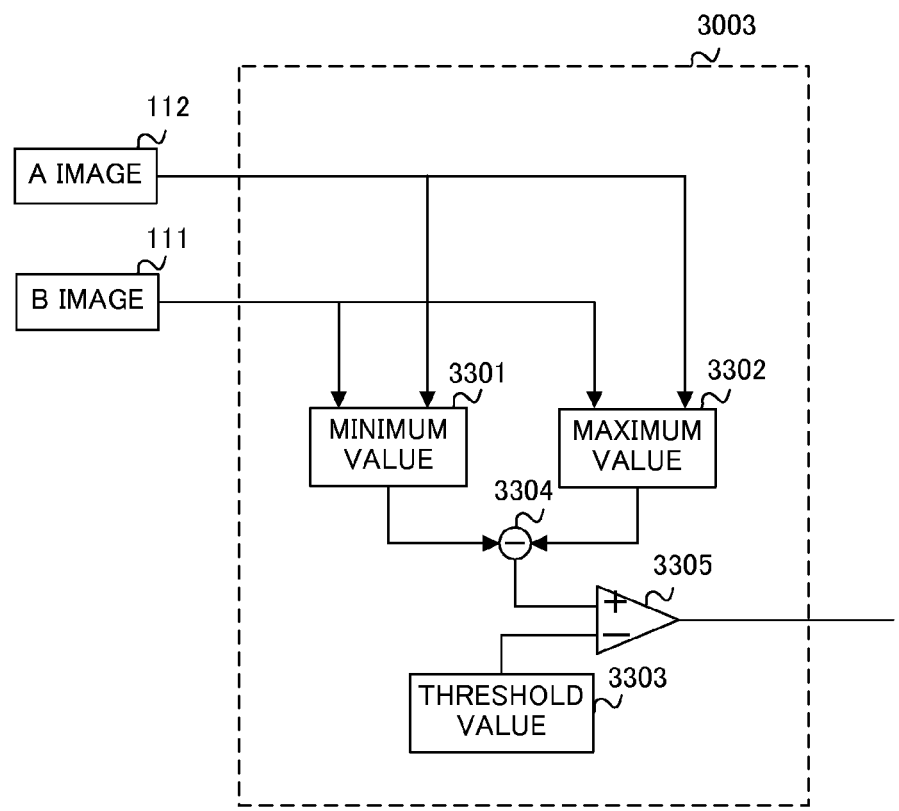
FIG. 29 is a view showing a configuration example of a phase difference reliability calculating part of Embodiment 9.

FIG. 29 shows a configuration example of the phase difference reliability calculating part 3003. The phase difference reliability calculating part 3003 receives outputs (A and B image video signals) of the A and B image holding circuits 112 and 111. Reference numeral 3301 denotes a minimum value memory for holding a minimum value of outputs of the A and B image holding circuits 112 and 111 for one field image (or one frame image).

Reference numeral 3302 denotes a maximum value memory for holding a maximum value of the outputs of the A and B image holding circuits 112 and 111 for one field image (or one frame image).

After completion of holding one field image (or one frame image), the maximum value memory 3302 and the minimum value memory 3301 output the held values to a subtractor 3304. The subtractor 3304 obtains a difference between the input maximum and minimum values, i.e., contrast, to output it to a comparator 3305. The comparator 3305 compares the contrast output from the subtractor 3304 with a threshold value (predetermined value) stored in a threshold value memory 3303. The comparator 3305 outputs "0" if the contrast is equal to the threshold value or larger, and outputs "1" if the contrast is smaller than the threshold value.

At Step S3005, the main object distinguishing part 3006 distinguishes a main object present in the real image from the signal processing part 106. As an example, a case of distinguishing whether or not the main object is a face will be described.

At Step S3006, the CPU 109 determines which of higher and lower values the reliability of the phase difference calculated by the phase difference reliability calculating part 3003 is as compared with a predetermined reliability (predetermined value). If the reliability of the phase difference is higher than the predetermined reliability, the CPU 109 proceeds to Step S3007.

At Step S3007, the CPU 109 determines whether or not the main object has been distinguished to be a face by the main object distinguishing part 3006. If the main object has been distinguished to be a face, the CPU 109 proceeds to Step S3008.

At Step S3008, the CPU 109 changes the switch 3004 to "0" (highlight image generating part 3001 side), and the switch 3007 to "0" (switch 3004 side). Then, the CPU 109 proceeds to Step S3030.

At Step S3030, the subtractor 118 of the highlight image generating part 3001 generates a differential signal equivalent to an absolute value of a difference between the A and B image pixel signals from the A and B image holding circuits 112 and 111 as in the case of Embodiment 1.

At Step S3031, the comparator 114 of the highlight image generating part 3001 compares the threshold value (predetermined value) stored in the threshold value memory 117 with a value of the differential signal (differential value) form the subtractor 118. The comparator 114 outputs "1" if the differential value is larger (or equal to or higher) than the threshold value, and "0" if not. The switch 116 is changed according to an output from the comparator 114. Then, the process proceeds to Step S3011.

At Step S3011, the superimpose synthesizing circuit 107 synthesizes the real image from the signal processing circuit 106 and the highlight image from the highlight image generating part 3001 by superimposing. Thus, an image having a highlight display color area superimposed on the real image is displayed by the display device 108. The highlight display color area may be flashed.

On the other hand, if the main object is determined not to be a face at Step S3007, proceeding to Step S3008, the CPU 109 changes the switch 3004 to "1" (split image generating part 3002 side), and the switch 3007 to "0" (switch 3004 side).

Figure 30:
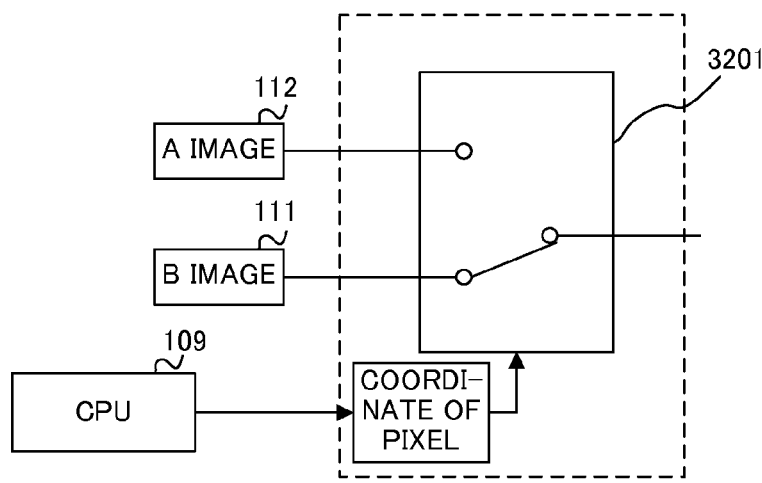
FIG. 30 is a view showing a configuration example of a split image generating part of Embodiment 9.

At Step S3040, the split image generating part 3002 generates a split image. FIG. 30 shows a configuration example of the split image generating part 3002.

The split image generating part 3002 receives outputs of the A and B image holding circuits 112 and 111. Reference numeral 3201 denotes a switch for switching an output of the split image generating part 3002 between the output sides of the A and B image holding circuits 112 and 111. If pixel coordinates are coordinates in the area 2101 shown in FIG. 19, the switch 3201 is switched to the output side of the A image holding circuit 112. The switch 3201 is switched to the output side of the B image holding circuit 111 if pixel coordinates are coordinates in the area 2102. A split image shown in FIG. 19 is accordingly generated.

At Step S3011, the superimpose synthesizing circuit 107 synthesizes the real image output from the signal processing circuit 106 with the split image by superimposing. Thus, an image having the split image superimposed on the real image is displayed by the display device 108.

If the reliability of the phase difference is determined to be low at Step S3006, the CPU 109 proceeds to Step S3010. At Step S3010, the CPU 109 switches the switch 3004 to "0" (highlight image generating part 3001 side), and the switch 3007 to "1" (partially enlarged image generating part 3008 side).

At Step S3050, the partially enlarged image generating part 3008 reads a trimmed area of the real image that the user has designated as an object area of a focusing target. Then, at Step S3051, the partially enlarged image generating part 3008 electronically enlarges the trimmed area of the real image by a predetermined magnification to output it.

Figure 23:
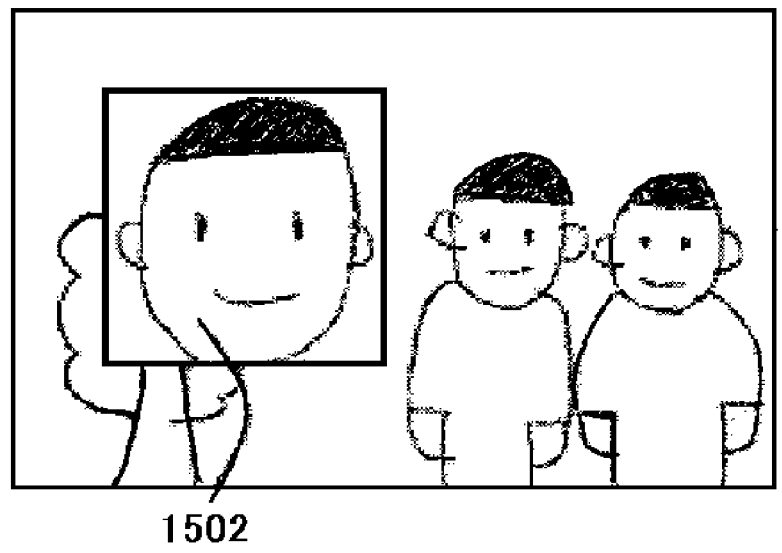
FIG. 23 is a view showing an example of a partially enlarged image of Embodiment 7.

At Step S3011, the superimpose synthesizing circuit 107 synthesizes the real image output from the signal processing circuit 106 with the partially enlarged image output from the partially enlarged image generating part 3008 by superimposing. Thus, as shown in FIG. 23, an image having the partially enlarged image superimposed on the real image is displayed by the display device 108.

As described above, according to the embodiment, the highlight image, the split image and the partially enlarged image are output as focus guide images respectively if the main object is a face, if the main object is not a face, and if the reliability of the phase difference is low. As a result, the focus guide image can be switched to an appropriate image according to the distinguishing result of the main object and the reliability of the phase difference to be displayed.

In the embodiment, the focus guide image is a highlight image if the main object is a face, and a split image if the main object is not a face. However, switching of the focus guide image may be performed differently. For example, the focus guide image may be a double image if the main object is a face, and a split image if the main object is not a face.

Embodiment 10

Embodiment 9 shows the configuration based on hardware. However, focus guide image switching processing similar to that of Embodiment 9 can also be implemented via software, for example, by employing the circuit structure of Embodiment 4 shown in FIG. 7.

Figure 31:
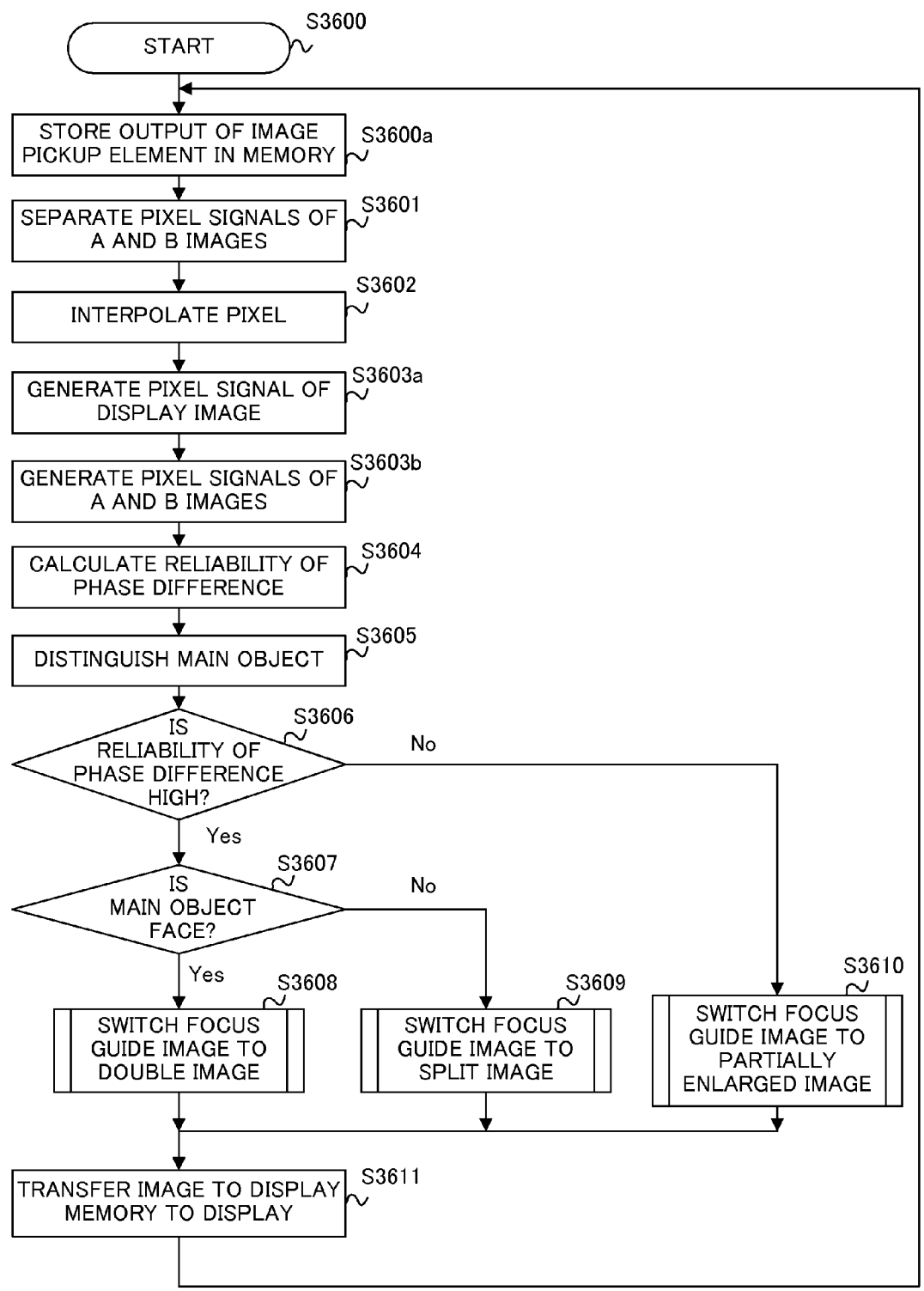
FIG. 31 is a flowchart showing a processing procedure of a camera that is Embodiment 10 of the present invention.

FIG. 31 shows a flow of processing (image displaying method) performed by a CPU 706 in the embodiment.

When processing is started at Step S3600, at Step S3600a, the CPU 706 converts a signal from an image pickup element 701 into a digital signal by an A/D converter 702 to store it in a memory 703. The data stored in the memory 703 contains a mixture of A and B image pixel signals from A and B image pixel groups, and a RGB pixel signal from an image pickup pixel group.

At Step S3601, the A and B image pixel signals are picked up (separated) from the data stored in the memory 703.

At Step S3602, the CPU 706 interpolates data of colors that should be originally located in positions of the A and B image pixels from pixel values of surrounding image pickup pixels. Thus, the CPU 706 generates a pixel-interpolated RGB pixel signal.

At Step S3603a, the CPU 706 processes the RGB pixel signal to generate a color display image that is a real image.

At Step S3603b, the CPU 706 generates pixel signals for A and B image data.

At Step S3604, the CPU 706 calculates a reliability of a phase difference. At Step S3605, the CPU 706 distinguishes a main object in the real image.

At Step S3606, the CPU 706 determines whether or not the reliability of the phase difference calculated at Step S3004 is higher than a predetermined reliability. The CPU 706 proceeds to Step S3607 if the reliability of the phase difference is higher than the predetermined reliability, and to Step S3610 if the reliability of the phase difference is lower than the predetermined reliability.

At Step S3607, the CPU 706 determines whether or not a distinguishing result of the main object at Step S3605 is a face. The CPU 706 proceeds to Step S3608 if the distinguishing result is a face, and to Step S3609 if the distinguishing result is not a face.

At Step S3608, the CPU 706 performs highlight displaying processing shown in FIG. 32. When the highlight displaying processing is started at Step S3080, at Step S3081, the CPU 706 determines whether or not a current routine is a timing (period) of highlighting. The determination of the timing of highlighting is made by a timer in the CPU 706. The CPU 706 proceeds to Step S3082 if the routine is the timing of highlighting. If the routine is not the timing of highlighting, the CPU 706 proceeds to Step S3083 to finish the processing, and then proceeds to Step S3611 of FIG. 31.

At Step S3082, the CPU 706 distinguishes a pixel (object area) in which a displacement amount (absolute value) between A and B images of the A and B image data is larger than a predetermined value. For a pixel in which a displacement amount is larger (equal to a fixed level or larger) than the predetermined threshold value, the CPU 706 overwrites a corresponding pixel of color display images with a color for highlighting. Then, the CPU 706 finishes the processing at Step S3083, and proceeds to Step S3611 of FIG. 31.

At Step S3609 of FIG. 31, the CPU 706 performs split image displaying processing shown in FIG. 33 according to a result of determination that the main object is not a face.

When the split image displaying processing is started at Step S3090, at Step S3091, the CPU 706 determines whether or not a determination target area of a color display image (real image) is an area for displaying A image data. If the determination target area is an area for displaying the A image data, the CPU 706 proceeds to Step S3092.

At Step S3092, the CPU 706 overwrites the determination target area of the color display image with the A image data. Then, the CPU 706 proceeds to Step S3093.

If the determination result of Step S3091 shows that the determination target area is not an area for displaying the A image data, the CPU 706 directly proceeds to Step S3093.

At Step S3093, the CPU 706 determines whether or not the determination target area of the color display image is an area for displaying the B image data. If the determination target area is an area for displaying the B image data, the CPU 706 proceeds to Step S3094.

At Step S3094, the CPU 706 overwrites the determination target area of the color display image with the B image data. Then, proceeding to Step S3095, the CPU 706 finishes the processing. The CPU 706 proceeds to Step S3611 of FIG. 31.

If the determination result of Step S3093 shows that the determination target area is not an area for displaying the B image data, the CPU 706 directly proceeds to Step S3095 to finish the processing. Then, the CPU 706 proceeds to Step S3611 of FIG. 31.

At Step S3610 of FIG. 31, the CPU 706 performs partially enlarged image displaying processing shown in FIG. 34 according to the result of determination that the reliability of the phase difference is lower than the predetermined reliability.

When partially enlarged image processing is started at Step S3100, at Step S3101, the CPU 706 trims an area of the color display image to be displayed.

At Step S3102, the CPU 706 electronically enlarges the trimmed area by a predetermined magnification to generate a partially enlarged image.

At Step S3103, the CPU 706 overwrites an area of the color display image for displaying a partially enlarged image with the partially enlarged image generated at Step S3102. The CPU 706 proceeds to Step S3104 to finish the processing. Then, the CPU 706 proceeds to Step S3611 of FIG. 31.

At Step S3611, the CPU 706 transfers one of the focus guide images generated at Steps S3608 to S3610 to the display memory 704. The image written in the display memory 704 is automatically transferred to the display device 705 to be displayed.

Though not described in the embodiment, a double image may be used as a focus guide image.

Each of the embodiments enables realization of an image pickup apparatus capable of displaying a focus guide image easily understood visually.

Each of the embodiments enables realization of an image pickup apparatus capable of switching focus guide images by a user or automatically.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application Nos. 2007-322770, filed on Dec. 14, 2007, 2007-322818, filed on Dec. 14, 2007 and 2008-270058, filed on Oct. 20, 2008 which are hereby incorporated by reference herein in their entirety.

What is claimed is:

1. An image pickup apparatus comprising:
   an image obtaining part configured to photoelectrically convert a first object image and a second object image formed by light fluxes divided by a pupil divider among light fluxes from an image pickup optical system to generate a first image and a second image, and photoelectrically converting a third object image formed by a light flux undivided by the pupil divider to generate a third image;
   a displaying part configured to display images; and
   a processing part configured to cause the displaying part to display to a user a superimposed image as a visual focus guide for achieving an in-focus state of the image pickup apparatus by a manual focus operation, the superimposed image being formed by superimposing an image indicating a difference between two of the first, second, and third images on the third image.

2. An image pickup apparatus according to claim 1, wherein the processing part displays one of areas of the superimposed image in which displacement amounts between the first and second object images are larger and smaller than a predetermined value by using a specific color.

3. An image pickup apparatus according to claim 2, wherein the processing part flashes displaying of the specific color.

4. An image pickup apparatus according to claim 1, wherein the image obtaining part is configured by using a single image pickup element which includes first pixels and second pixels for photoelectrically converting the first object image and the second object image respectively, and third pixels for photoelectrically converting the third object image formed by a light flux undivided by the pupil divider among the light fluxes from the image pickup optical system.

5. An image displaying method for an image pickup apparatus including a displaying part, comprising the steps of:
   photoelectrically converting a first object image and a second object image formed by light fluxes divided by a pupil divider among light fluxes from an image pickup optical system to generate a first image and a second image, and photoelectrically converting a third object image formed by a light flux undivided by the pupil divider to generate a third image; and
superimposing an image indicating a difference between two of the first, second and third images on the third image to form a superimposed image displayed to a user by the displaying part as a visual focus guide for achieving an in-focus state of the image pickup apparatus by a manual focus operation.

* * * * *